(12) United States Patent
Peng et al.

(10) Patent No.: US 11,484,866 B2
(45) Date of Patent: Nov. 1, 2022

(54) COMPOSITE MATERIALS AND METHODS OF MAKING AND USE THEREOF

(71) Applicant: THE BOARD OF TRUSTEES OF THE UNIVERSITY OF ALABAMA, Tuscaloosa, AL (US)

(72) Inventors: Qing Peng, Watkinsville, GA (US); Ruigang Wang, Tuscaloosa, AL (US); Haoming Yan, Tuscaloosa, AL (US); Zhongqi Liu, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 354 days.

(21) Appl. No.: 16/593,276

(22) Filed: Oct. 4, 2019

(65) Prior Publication Data
US 2020/0108372 A1 Apr. 9, 2020

Related U.S. Application Data

(60) Provisional application No. 62/741,760, filed on Oct. 5, 2018.

(51) Int. Cl.
*B01J 23/89* (2006.01)
*B01J 21/02* (2006.01)
(Continued)

(52) U.S. Cl.
CPC .............. *B01J 23/894* (2013.01); *B01J 21/02* (2013.01); *B01J 21/04* (2013.01); *B01J 23/10* (2013.01);
(Continued)

(58) Field of Classification Search
CPC ... B01J 21/02; B01J 21/04; B01J 23/10; B01J 23/894
See application file for complete search history.

(56) References Cited

U.S. PATENT DOCUMENTS

| 2010/0297447 A1* | 11/2010 | Tadakuma | ............ C09C 1/3661 427/584 |
| 2012/0083643 A1* | 4/2012 | Rashidi | ................ B01J 37/0009 502/313 |

(Continued)

OTHER PUBLICATIONS

Zazpe (Atomic Layer Deposition Al2O3 coating Significantly Improve Thermal, Chemical and Mechanical Stability of Anodic TiO2 Nanotube Layers, Langmuir, 33, 13, 3208-3216).*

(Continued)

*Primary Examiner* — Jun Li
(74) *Attorney, Agent, or Firm* — Meunier Carlin & Curfman LLC

(57) ABSTRACT

Disclosed herein are composite materials and methods of making and use thereof. The composite materials disclosed herein can comprise: a first metal oxide particle having a thermal stability and a specific reversible oxygen storage capacity, wherein the first metal oxide particle comprises a first metal oxide comprising a transition metal oxide; and a second metal oxide disposed on the first metal oxide particle; wherein the composite material has a thermal stability and a specific reversible oxygen storage capacity; and wherein the thermal stability of the composite material is greater than the thermal stability of the first metal oxide particle. The methods of use of the composite materials described herein can comprise using the composite material as a catalyst, as an oxygen carrier, as a catalyst support, in a fuel cell, in a catalytic converter, or a combination thereof.

14 Claims, 15 Drawing Sheets

(51) Int. Cl.
*B01J 37/02* (2006.01)
*B01J 21/04* (2006.01)
*B01J 23/10* (2006.01)
*B01J 35/00* (2006.01)
*B01J 35/02* (2006.01)

(52) U.S. Cl.
CPC ......... *B01J 35/002* (2013.01); *B01J 35/0013* (2013.01); *B01J 35/023* (2013.01); *B01J 37/0221* (2013.01)

(56) References Cited

U.S. PATENT DOCUMENTS

2014/0256534 A1* 9/2014 Gao .................. B01J 23/34 502/344
2017/0165640 A1* 6/2017 Castillo Cervantes .. B01J 37/06

OTHER PUBLICATIONS

Luo (Influence of Different Aluminum Salts on the Photocatalytic Properties of Al doped TiO2 nanoparticles towards the degradation of AO7 dye, Sceintific Reports 7, Article No. 8108 (2017) published Aug. 14, 2017).*
Ellis to (Synthesis and characterization of Zr- and Hf-doped nano-TiO2 as internal standards for analytical quantification of nanomaterials in complex matrices, R. Soc. open sci. 5: 171884. http://dx.doi.org/10.1098/rsos.171884, published Aug. 20, 2018).*
Aneggi et al. Shape-Dependent Activity of Ceria in Soot Combustion. Acs Catalysis 2014, 4, 172-181.
Baudin et al. Dynamics, Structure and Energetics of the (111), (011) and (001) Surfaces of Ceria. Surf. Sci. 2000, 468, 51-61.
Desaunay et al. Surface-Dependent Oxidation of H-2 on CeO2 Surfaces. J. Catal. 2013, 297, 193-201.
Ding et al. Enhancing SOFC cathode performance by surface modification through infiltration. Energy Environ. Sci. 2014, 7, 552-575.
Esch et al. Electron Localization Determines Defect Formation on Ceria Substrates. Science 2005, 309, 752-755.
Fan et al. Influence of Surface Diffusion on the Formation of Hollow Nanostructures induced by the Kirkendall Effect: The Basic Concept. Nano Lett. 2007, 7, 993-997.
Fino et al. A Review on the Catalytic Combustion of Soot in Diesel Particulate Filters for Automotive Applications: From Powder Catalysts to Structured Reactors. Applied Catalysis A—General 2016, 509, 75-96.
Fornasiero et al. Modification of the Redox Behaviour of CeO2 Induced by Structural Doping with ZrO2. J. Catal. 1996, 164, 173-183.
Fu et al. Active nonmetallic Au and Pt species on ceria-based water-gas shift catalysts. Science 2003, 301, 935-938.
Gao et al. Surface Engineering on CeO2 Nanorods by Chemical Redox Etching and their Enhanced Catalytic Activity for CO Oxidation. Nanoscale 2015, 7, 11686-11691.
George. Atomic Layer Deposition: An Overview. Chem. Rev. 2010, 110, 111-131.
He et al. Thermally Induced Deactivation and the Corresponding Strategies for Improving Durability in Automotive Three-Way Catalysts. Johnson Matthey Tech 2016, 60, 196-203.
Huang. Oxide Nanocrystal Model Catalysts. Accounts of Chemical Research 2016, 49, 520-527.
Jones et al. Thermally stable single-atom platinum-on-ceria catalysts via atom trapping. Science 2016, 353, 150-154.
Li et al. CO2 Capture with Chemical Looping Combustion of Gaseous Fuels: An Overview. Energ Fuel 2017, 31, 3475-3524.
Liu et al. Oxygen Vacancy Clusters Promoting Reducibility and Activity of Ceria Nanorods. J. Am. Chem. Soc. 2009, 131, 3140-3141.
Mai et al. Shape-Selective Synthesis and Oxygen Storage Behavior of Ceria Nanopolyhedra, Nanorods, and Nanocubes. J. Phys. Chem. B 2005, 109, 24380-24385.
Miikkulainen et al. Crystallinity of Inorganic Films Grown by Atomic Layer Deposition: Overview and General Trends. J. Appl. Phys. 2013, 113, 021301.
Montini et al. Fundamentals and Catalytic Applications of CeO2-Based Materials. Chem. Rev. 2016, 116, 5987-6041.
Morikawa et al. A new concept in high performance ceria-zirconia oxygen storage capacity material with Al2O3 as a diffusion barrier. Appl. Catal. B-Environ. 2008, 78, 210-221.
Murray et al. A Direct-Methane Fuel Cell with a Ceria-Based Anode. Nature 1999, 400, 649-651.
Nolan et al. Density functional theory studies of the structure and electronic structure of pure and defective low index surfaces of ceria. Surf. Sci. 2005, 576, 217-229.
Peng et al. Atomic Layer Deposition for Electrochemical Energy Generation and Storage Systems. Journal of Vacuum Science & Technology A 2012, 30, 010803.
Peng et al. Atomic Layer Deposition on Electrospun Polymer Fibers as a Direct Route to Al2O3 Microtubes with Precise Wall Thickness Control. Nano Lett. 2007, 7, 719-722.
Puurunen. Surface Chemistry of Atomic Layer Deposition: A Case Study for the Trimethylaluminum/Water Process. J. Appl. Phys. 2005, 97, 121301.
Shi et al. Relation between Grain Growth, Densification and Surface Diffusion in Solid State Sintering—A Direct Observation. J Mater Sci 2005, 40, 5711-5719.
Shyu et al. Surface Characterization of Alumina-Supported Ceria. Journal of Physical Chemistry 1988, 92, 4964-4970.
Ta et al. Stabilized Gold Nanoparticles on Ceria Nanorods by Strong Interfacial Anchoring. J. Am. Chem. Soc. 2012, 134, 20585-20588.
Trovarelli et al. Ceria Catalysts at Nanoscale: How Do Crystal Shapes Shape Catalysis? Acs Catalysis 2017, 7, 4716-4735.
Trovarelli et al. The utilization of ceria in industrial catalysis. Catal. Today 1999, 50, 353-367.
Vayssilov et al. Support nanostructure boosts oxygen transfer to catalytically active platinum nanoparticles. Nat. Mater. 2011, 10, 310-315.
Vlaic et al. Relationship between the Zirconia-Promoted Reduction in the RH-Loaded Ce0.5Zr0.5O2 Mixed Oxide and the Zr—O Local Structure. J. Catal. 1997, 168, 386-392.
Vogt et al. Fluid catalytic cracking: recent developments on the grand old lady of zeolite catalysis. Chemical Society Reviews 2015, 44, 7342-7370.
Wachsman et al. Structural and defect studies in solid oxide electrolytes. Solid State Ionics, 1992, 52, 216.
Wu et al. Probing Defect Sites on CeO2 Nanocrystals with Well-Defined Surface Planes by Raman Spectroscopy and O-2 Adsorption. Langmuir 2010, 26, 16595-16606.
Wu et al. Spectroscopic Investigation of Surface-Dependent Acid Base Property of Ceria Nanoshapes. Journal of Physical Chemistry C 2015, 119, 7340-7350.
Yao et al. Ceria in Automotive Exhaust Catalysts .1. Oxygen Storage. J. Catal. 1984, 86, 254-265.
Yao. Surface Interaction in the MoO3-Gamma-Al2O3 System. J. Catal. 1981, 70, 440-444.
Yu et al. Probe Decomposition of Methylammonium Lead Iodide Perovskite in N2 and O2 by in Situ Infrared Spectroscopy. The Journal of Physical Chemistry A 2017, 121, 1169-1174.
Zaera. The Surface Chemistry of Atomic Layer Depositions of Solid Thin Films. J. Phys. Chem. Lett. 2012, 3, 1301-1309.
Zhang et al. Pt/Porous Nanorods of Ceria as Efficient High Temperature Catalysts with Remarkable Catalytic Stability for Carbon Dioxide Reforming of Methane. Journal of Materials Chemistry A 2015, 3, 18074-18082.
Zhou et al. Enhanced Catalytic Activity of Ceria Nanorods from Well-Defined Reactive Crystal Planes. J. Catal. 2005, 229, 206-212.

* cited by examiner

COMPOSITE MATERIALS AND METHODS OF MAKING AND USE THEREOF

CROSS-REFERENCE TO RELATED APPLICATIONS

This application claims the benefit of priority to U.S. Provisional Application No. 62/741,760 filed Oct. 5, 2018, which is hereby incorporated herein by reference in its entirety.

BACKGROUND

Certain metal oxides have reversible oxygen storage capacities (OSCs), i.e., the ability to shuttle oxygen between reduction and oxidation environments. Such metal oxides have been used and explored as a catalyst or catalyst support in various applications, such as catalysts in catalytic converters, fluid catalytic cracking, catalytic oxidation of soot from diesel engines, solid oxide fuel cells, etc. For all of these applications, a need exists for improving the thermal stability of the metal oxides. The compositions and methods discussed herein addresses these and other needs.

SUMMARY

In accordance with the purposes of the disclosed compositions and methods as embodied and broadly described herein, the disclosed subject matter relates to composite materials and methods of making and methods of use thereof.

For example, disclosed herein are composite materials comprising: a first metal oxide particle having a thermal stability and a specific reversible oxygen storage capacity, and wherein the first metal oxide particle comprises a first metal oxide comprising a transition metal oxide; and a second metal oxide disposed on the first metal oxide particle; wherein the composite material has a thermal stability and a specific reversible oxygen storage capacity; and wherein the thermal stability of the composite material is greater than the thermal stability of the first metal oxide particle.

The transition metal oxide can, for example, comprise a transition metal selected from the group consisting of Ce, Mo, Fe, Ti, W, V, and combinations thereof. In some examples, the transition metal oxide comprises $CeO_2$, $MoO_3$, $Fe_2O_3$, $TiO_2$, $WO_3$, $V_2O_5$, or a combination thereof. In certain examples, the transition metal oxide comprises $CeO_2$.

In some examples, the first metal oxide particle has a shape that is substantially non-spherical. For example, the first metal oxide particle can have a shape that is substantially ellipsoidal, triangular, pyramidal, tetrahedral, cylindrical, rectangular, cuboidal, or cuboctahedral. In some examples, the first metal oxide particle has an average characteristic dimension of from 1 nanometer (nm) to 1000 nm.

The first metal oxide particle can, for example, comprise a rod shaped particle having an average length and an average diameter. In some examples, the average length of the rod shaped particle is from 1 nm to 1 millimeter (mm). In some examples, the average diameter of the rod shaped particle is from 1 nm to 1000 nm. In some examples, the rod shaped particle has an average aspect ratio of from 0.001 to $1 \times 10^6$. In certain examples, the first metal oxide particle comprises a rod shaped particle comprising $CeO_2$.

The second metal oxide can, for example, comprise a metal selected from the group consisting of Al, Ti, Zr, Hf, Nb, and combinations thereof. In some examples, the second metal oxide comprises $Al_2O_3$, $TiO_2$, $ZrO_2$, $HfO_2$, $Nb_2O_5$, or a combination thereof. In certain examples, the second metal oxide comprises $Al_2O_3$.

In some examples, the first metal oxide particle comprises $CeO_2$ and the second metal oxide comprises $Al_2O_3$. In some examples, the first metal oxide particle comprises a rod-shaped particle comprising $CeO_2$ and the second metal oxide comprises $Al_2O_3$.

The second metal oxide can, for example, be present in an amount of 5 wt. % or less based on the amount of the first metal oxide in the composite material.

In some examples, the second metal oxide is disposed on the first metal oxide particle as a plurality of particles comprising the second metal oxide. In some examples, the plurality of particles comprising the second metal oxide have a shape that is substantially spherical, ellipsoidal, triangular, pyramidal, tetrahedral, polygonal, cylindrical, rectangular, cuboidal, cuboctahedral, or a combination thereof. In some examples, the plurality of particles comprising the second metal oxide have an average particle size of 5 nm or less.

In some examples, the composite material has a shape that remains substantially unchanged after heating the composite material at a temperature of 300° C. or more for an amount of time of 5 hours or more. In some examples, the composite material has a specific reversible oxygen storage capacity and the specific reversible oxygen storage capacity of the composite material decreases by 50% or less after heating the composite material at a temperature of 300° C. or more for an amount of time of 5 hours or more. In some examples, the composite material has specific reversible oxygen storage capacity and the specific reversible oxygen storage capacity of the composite material after heating the composite material at a temperature of 300° C. or more for an amount of time of 5 hour or more is greater than the specific reversible oxygen storage capacity of the first metal oxide particle after heating the first metal oxide particle at the same temperature for the same amount of time.

Also disclosed herein are methods of making the composite materials described herein. For example, the methods of making the composite materials can comprise depositing the second metal oxide on the first metal oxide particle. In some examples, the second metal oxide is deposited on the first metal oxide particle by sputtering, pulsed layer deposition, molecular beam epitaxy, evaporation, atomic layer deposition, printing, lithographic deposition, electron beam deposition, thermal deposition, spin coating, drop-casting, zone casting, dip coating, blade coating, spraying, vacuum filtration, or combinations thereof. In some examples, the second metal oxide is disposed on the first metal oxide particle by atomic layer deposition. In some examples, the second metal oxide is disposed on the first metal oxide particle by from 1 to 100 cycles of atomic layer deposition. In some examples, the methods further comprise making the first metal oxide particle.

Also disclosed herein are methods of use of the composite materials described herein. For example, the method of use of the composite material can comprise using the composite material as a catalyst. In some examples, the composite material is used as a catalyst for CO oxidation, water-gas shift reaction, thermal water splitting, diesel root oxidation, chemical looping, or a combination thereof. In some examples, the method of use of the composite material can comprise using the composite material as an oxygen carrier.

In some examples, the method of use of the composite material can comprise using the composite material as a catalyst support.

Also disclosed herein are catalysts comprising the composite materials described herein. Also disclosed herein are catalyst supports comprising the composite materials described herein. Also disclosed herein are fuel cells comprising the catalysts and/or the catalyst supports described herein. Also disclosed herein are catalytic converters comprising the catalysts and/or the catalyst supports described herein.

Additional advantages of the disclosed compositions and methods will be set forth in part in the description which follows, and in part will be obvious from the description. The advantages of the disclosed compositions and methods will be realized and attained by means of the elements and combinations particularly pointed out in the appended claims. It is to be understood that both the foregoing general description and the following detailed description are exemplary and explanatory only and are not restrictive of the disclosed systems and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

FIG. 1A-FIG. 1H are transmission electron microscopy (TEM) images of: (FIG. 1A) $CeO_2$ nanorods ($CeO_2$ NRs); (FIG. 1B) $CeO_2$ NRs after heat treatment at 700° C. in $N_2$ for 5 h (HT) ($CeO_2$ NRs_HT); (FIG. 1C, FIG. 1D) 45-cycle ALD $Al_2O_3/CeO_2$ NRs; (FIG. 1E, FIG. 1F) 45-cycle ALD $Al_2O_3/CeO_2$ NRs_HT; (FIG. 1G) 1-cycle ALD $Al_2O_3/CeO_2$ NRs_HT; (FIG. 1H) 10-cycle ALD $Al_2O_3/CeO_2$ NRs_HT. N-cycle ALD $Al_2O_3/CeO_2$ NRs_HT: $CeO_2$ nanorods with n cycles of $Al_2O_3$ ALD coating followed by heat treatment at 700° C. in $N_2$ for 5 h (HT). ALD $Al_2O_3$ was carried at 200° C. with trimethyl aluminum [$Al(CH_3)_3$] and $H_2O$ as the reactants.

DETAILED DESCRIPTION

Figure 1A:
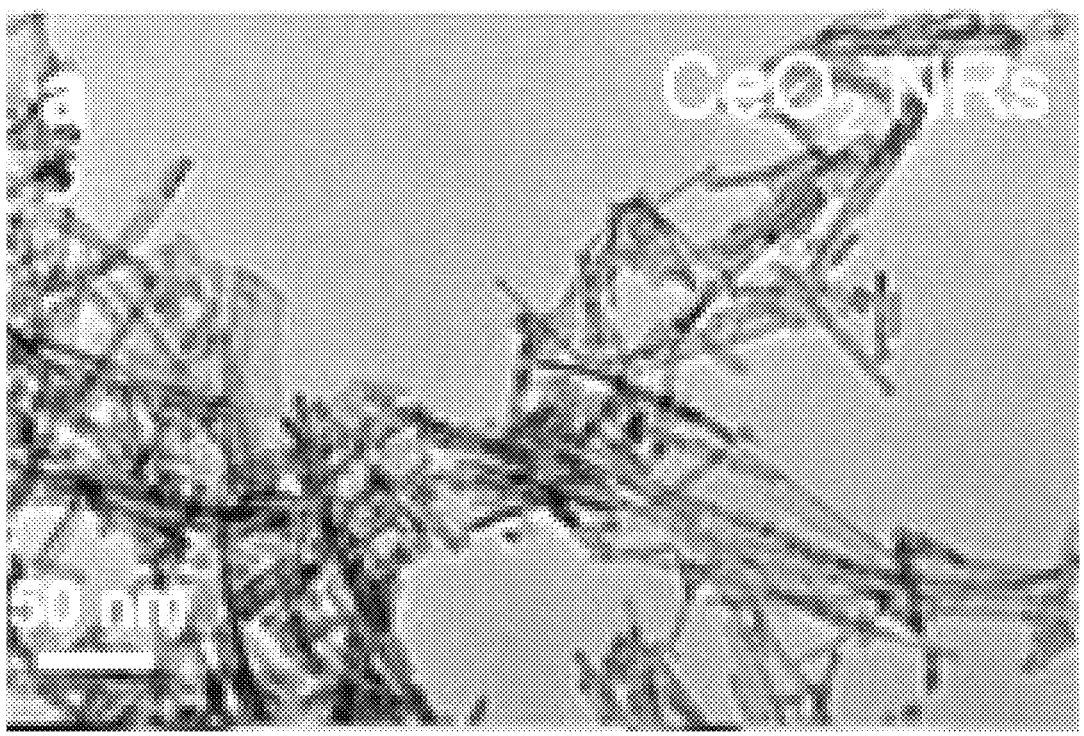

The compositions and methods described herein may be understood more readily by reference to the following detailed description of specific aspects of the disclosed subject matter and the Examples included therein.

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Composite Materials

Disclosed herein are composite materials comprising a first metal oxide particle and a second metal oxide disposed on the first metal oxide particle. As used herein, "a first metal oxide particle" and "the first metal oxide particle" are meant to include any number of first metal oxide particles. Thus, for example "the first metal oxide particle" includes one or more first metal oxide particles. In some examples, the first metal oxide particle can comprise a plurality of first metal oxide particles.

The first metal oxide particle comprises a first metal oxide comprising a transition metal oxide. The transition metal oxide can, for example, comprise a transition metal. The transition metal can, for example, be selected from the group consisting of Sc, Ti, V, Cr, Mn, Fe, Co, Ni, Cu, Zn, Y, Zr, Nb, Mo, Tc, Ru, Rh, Pd, Ag, Cd, La, Ce, Pr, Nd, Pm, Sm, Eu, Gd, Tb, Dy, Ho, Er, Tm, Yb, Hf, Ta, W, Re, Os, Ir, Pt, Au, Hg, and combinations thereof. In some examples, the transition metal oxide can comprise a transition metal selected from the group consisting of Ce, Mo, Fe, Ti, W, V, and combinations thereof. In some examples, the transition metal oxide can comprise $CeO_2$, $MoO_3$, $Fe_2O_3$, $TiO_2$, $WO_3$, $V_2O_5$, or a combination thereof. In some examples, the transition metal oxide comprises $CeO_2$ (e.g., the first metal oxide particle comprises a particle comprising $CeO_2$).

The first metal oxide particle can comprise a particle of any shape. The first metal oxide particle can have an irregular shape, a regular shape, an isotropic shape, an anisotropic shape, or a combination thereof. In some examples, the first metal oxide particle can have an isotropic shape. In some examples, the first metal oxide particle can have an anisotropic shape. In some examples, the first metal oxide particle can have a shape that is substantially non-spherical. Examples of substantially non-spherical shapes include, but are not limited to, ellipsoids, triangles, pyramids, tetrahedra, cylinders, rectangles, cubes, octahedra, and cuboctahedra. In some examples, the first metal oxide particle can be substantially rod shaped.

The first metal oxide particle is a three-dimensional particle having at least one dimension on the nanometer size scale, e.g., having at least one dimension that is from 1 nm to 1000 nm, wherein this dimension is referred to herein as the "characteristic dimension" of the first metal oxide particle. As used herein a "dimension" of the particle refers to the largest straight line distance between two points on the surface of the particle along a particular axis.

The first metal oxide particle can have an average characteristic dimension. "Average characteristic dimension" and "mean characteristic dimension" are used interchangeably herein, and generally refer to the statistical mean characteristic dimension of the particles in a population of particles. For an anisotropic particle, the average characteristic dimension can refer to, for example, the length of a rod shaped particle, the diameter of a rod shaped particle, the diagonal of a cube shape particle, the side length of a cube shaped particle, the bisector of a triangular shaped particle, the side length of a triangular shaped particle, the length of one of the principle axes of an ellipsoidal particle, etc. The characteristic dimension can be measured using methods known in the art, such as evaluation by scanning electron microscopy, transmission electron microscopy, atomic force microscopy, and/or dynamic light scattering. As used herein, the average characteristic dimension is determined using electron microscopy.

The first metal oxide particle can, for example, have an average characteristic dimension of 1 nanometer (nm) or more (e.g., 2 nm or more, 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 275 nm or more, 300 nm or more, 350 nm or more, 400 nm or more, 450 nm or more, 500 nm or more, 600 nm or more, 700 nm or more, or 800 nm or more). In some examples, the first metal oxide particle can have an average characteristic dimension of 1000 nm or less (e.g., 900 nm or less, 800 nm or less, 700 nm or less, 600 nm or less, 500 nm or less, 450 nm or less, 400 nm or less, 350 nm or less, 300 nm or less, 375 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, or 5 nm or less). The average characteristic dimension of the first metal oxide particle can range from any of the minimum values described above to any of the maximum values described above. For example, the first metal oxide particle can have an average characteristic dimension of from 1 nm to 1000 nm (e.g., from 1 nm to 500 nm, from 500 nm to 1000 nm, from 1 nm to 200 nm, from 200 nm to 400 nm, from 400 nm to 600 nm, from 600 nm to 800 nm, from 800 nm to 10000 nm, from 1 nm to 700 nm, from 1 nm to 300 nm, from 1 nm to 100 nm, from 1 nm to 50 nm, from 50 nm to 100 nm, from 1 nm to 20 nm, from 20 nm to 40 nm, from 40 nm to 60 nm, from 60 nm to 80 nm, from 80 nm to 100 nm, or from 5 nm to 90 nm). The average characteristic dimension of the first metal oxide particle can, for example, be measured using electron microscopy.

In some examples, the first metal oxide particle can comprise a plurality of first metal oxide particles, and the plurality of first metal oxide particles can be substantially monodisperse. "Monodisperse" and "homogeneous size distribution," as used herein, and generally describe a population of particles where all of the particles have the same or nearly the same particle dimensions. As used herein, a monodisperse distribution refers to particle distributions in which 80% of the distribution (e.g., 85% of the distribution, 90% of the distribution, or 95% of the distribution) lies within 25% of the average particle dimensions (e.g., within 20% of the average particle dimensions, within 15% of the average particle dimensions, within 10% of the average particle dimensions, or within 5% of the average particle dimensions).

The first metal oxide particle can, in some examples, comprise a rod-shaped particle having an average length and an average diameter. In some examples, the first metal oxide particle can comprise a rod-shaped particle comprising $CeO_2$.

The average length of the rod-shaped particle can, for example, be 1 nm or more (e.g., 2 nm or more, 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 150 nm or more, 200 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometer (micron, μm) or more, 2 μm or more, 3 μm or more, 4 μm or more, 5 μm or more, 6 μm or more, 7 μm or more, 8 μm or more, 9 μm or more, 10 μm or more, 15 μm or more, 20 μm or more, 25 μm or more, 30 μm or more, 35 μm or more, 40 μm or more, 45 μm or more, 50 μm or more, 60 μm or more, 70 μm or more, 80 μm or more, 90 μm or more, 100 μm or more, 150 μm or more, 200 μm or more, 250 μm or more, 300 μm or more, 350 μm or more, 400 μm or more, 450 μm or more, 500 μm or more, 600 μm or more, 700 μm or more, or 800 μm or more). In some examples, the average length of the rod-shaped particle can be 1 millimeter (mm) or less (e.g., 900 μm or less, 800 μm or less, 700 μm or less, 600 μm or less, 500 μm or less, 450 μm or less, 400 μm or less, 350 μm or less, 300 μm or less, 250 μm or less, 200 μm or less, 150 μm or less, 100 μm or less, 90 μm or less, 80 μm or less, 70 μm or less, 60 μm or less, 50 μm or less, 45 μm or less, 40 μm or less, 35 μm or less, 30 μm or less, 25 μm or less, 20 μm or less, 15 μm or less, 10 μm or less, 9 μm or less, 8 μm or less, 7 μm or less, 6 μm or less, 5 μm or less, 4 μm or less, 3 μm or less, 2 μm or less, 1 μm or less, 900 nm or less, 800 nm or less, 700 nm or less, 600 nm or less, 500 nm or less, 450 nm or less, 400 nm or less, 350 nm or less, 300 nm or less, 250 nm or less, 200 nm or less, 150 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, or 5 nm or less). The average length of the rod-shaped particle can, for example, be from 1 nm to 1 mm (e.g., from 1 nm to 10 nm, from 10 nm to 100 nm, from 100 nm to 500 nm, from 500 nm to 1 μm, from 1 μm to 10 μm, from 10 μm to 100 μm, from 100 μm to 500 μm, from 500 μm to 1 mm, from 1 nm to 1 μm, from 1 μm to 1 mm, or from 5 nm to 500 μm).

The average diameter of the rod-shaped particle can, for example, be 1 nm or more (e.g., 2 nm or more, 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 275 nm or more, 300 nm or more, 350 nm or more, 400 nm or more, 450 nm or more, 500 nm or more, 600 nm or more, 700 nm or more, or 800 nm or more). In some examples, the average diameter of the rod-shaped particle can be 1000 nm or less (e.g., 900 nm or less, 800 nm or less, 700 nm or less, 600 nm or less, 500 nm or less, 450 nm or less, 400 nm or less, 350 nm or less, 300 nm or less, 375 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, or 5 nm or less). The average diameter of the rod-shaped particle can range from any of the minimum values described above to any of the maximum values described above. For example, the average diameter of the rod-shaped particle can be from 1 nm to 1000 nm (e.g., from 1 nm to 500 nm, from 500 nm to 1000 nm, from 1 nm to 200 nm, from 200 nm to 400 nm, from 400 nm to 600 nm, from 600 nm to 800 nm, from 800 nm to 10000 nm, from 1 nm to 700 nm, from 1 nm to 300 nm, from 1 nm to 100 nm, from 1 nm to 50 nm, from 50 nm to 100 nm, from 1 nm to 20 nm, from 20 nm to 40 nm, from 40 nm to 60 nm, from 60 nm to 80 nm, from 80 nm to 100 nm, or from 5 nm to 90 nm).

In some examples, the rod-shaped particle can be described by its aspect ratio, which, as used herein, is the length of a rod-shaped particle divided by the diameter of a rod-shaped particle. For example, the rod-shaped particle can have an average aspect ratio of 0.001 or more (e.g., 0.005 or more, 0.01 or more, 0.05 or more, 0.1 or more, 0.5 or more, 1 or more, 2 or more, 3 or more, 4 or more, 5 or more, 6 or more, 7 or more, 8 or more, 9 or more, 10 or more, 15 or more, 20 or more, 25 or more, 30 or more, 40 or more, 50 or more, 100 or more, 500 or more, $1 \times 10^3$ or more, $5 \times 10^3$ or more, $1 \times 10^4$ or more, $5 \times 10^4$ or more, $1 \times 10^5$ or more, or $5 \times 10^5$ or more). In some examples, the rod-shaped particle can have an average aspect ratio of $1 \times 10^6$ or less (e.g., $5 \times 10^5$ or less, $1 \times 10^5$ or less, $5 \times 10^4$ or less, $1 \times 10^4$ or less, $5 \times 10^3$ or less, $1 \times 10^3$ or less, 500 or less, 100 or less, 50 or less, 40 or less, 30 or less, 25 or less, 20 or less, 15 or less, 10 or less, 9 or less, 8 or less, 7 or less, 6 or less, 5 or less, 4 or less, 3 or less, 2 or less, 1 or less, 0.5 or less, 0.1 or less, 0.05 or less, or 0.01 or less). The average aspect ratio of the rod-shaped particle can range from any of the minimum values described above to any of the maximum values described above. For example, the rod-shaped particle can have an average aspect ratio of from 0.001 to $1 \times 10^6$ (e.g., from 0.001 to 0.01, from 0.01 to 0.1, from 0.1 to 1, from 1 to 10, from 10 to 100, from 100 to $1 \times 10^3$, from $1 \times 10^3$ to $1 \times 10^4$, from $1 \times 10^4$ to $1 \times 10^5$, from $1 \times 10^5$ to $1 \times 10^6$, from 1 to 100, or from 1 to 20).

In some examples, the first metal oxide particle can comprise a plurality of particles comprising the first metal oxide and the plurality of particles comprising the first metal oxide can comprise: a first population of particles comprising a first material and having a first particle shape having a first set of average particle dimensions including a first average characteristic dimension; and a second population of particles comprising a second material and having a second particle shape having a second set of average particle dimensions including a second average characteristic dimension; wherein the one or more of the dimensions of the first set of average particle dimensions and one or more of the dimensions of the second set of average particle dimensions are different, the first average characteristic dimension and the second average characteristic dimension are different, the first particle shape and the second particle shape are different, the first material and the second material are different, or a combination thereof. In some examples, the plurality of particles comprising the first metal oxide can comprise a mixture of a plurality of populations of particles, wherein each population of particles within the mixture is different with respect to shape, composition, dimension(s), average characteristic dimension, or combinations thereof.

The first metal oxide particle has a specific reversible oxygen storage capacity and a thermal stability. As used herein "thermal stability" refers to the stability of the shape and/or specific reversible oxygen storage capacity of a material upon heating at an elevated temperature for an amount of time. For example, the thermal stability of the first metal oxide particle can refer to the change in the shape and/or specific reversible oxygen storage capacity of the first metal oxide particle after heating the first metal oxide particle at a temperature of 300° C. or more (e.g., 350° C. or more, 400° C. or more, 450° C. or more, 500° C. or more, 550° C. or more, 600° C. or more, 650° C. or more, 700° C. or more, 750° C. or more, 800° C. or more, 850° C. or more, 900° C. or more, 950° C. or more, 1000° C. or more, 1050° C. or more, or 1100° C. or more) for an amount of time of 5 hours or more (e.g., 6 hours or more, 12 hours or more, 18 hours or more, 24 hours or more, 36 hours or more, or 48 hours or more). In some examples, the thermal stability of the first metal oxide particle can refer to the change in the shape and/or specific reversible oxygen storage capacity of the first metal oxide particle after heating the first metal oxide particle at a temperature of 1200° C. or less (e.g., 1150° C. or less, 1100° C. or less, 1050° C. or less, 1000° C. or less, 950° C. or less, 900° C. or less, 850° C. or less, 800° C. or less, 750° C. or less, 700° C. or less, 650° C. or less, 600° C. or less, 550° C. or less, 500° C. or less, 450° C. or less, or 400° C. or less) for an amount of time of 5 hours or more (e.g., 6 hours or more, 12 hours or more, 18 hours or more, 24 hours or more, 36 hours or more, or 48 hours or more). The temperature at which the first metal oxide particle is heated can range from any of the minimum values described above to any of the maximum values described above. For example, the thermal stability of the first metal oxide particle can refer to the change in the shape and/or specific reversible oxygen storage capacity of the first metal oxide particle after heating the first metal oxide particle at a temperature of from 300° C. to 1200° C. (e.g., from 300° C. to 750° C., from 750° C. to 1200° C., from 300° C. to 600° C., from 600° C. to 900° C., from 900° C. to 1200° C., from 500° C. to 1200° C., from 300° C. to 700° C., or from 1000° C. to 1200° C.) for an amount of time of 5 hours or more (e.g., 6 hours or more, 12 hours or more, 18 hours or more, 24 hours or more, 36 hours or more, or 48 hours or more). As used herein, a change in "shape" can refer to a change in one or more dimensions of a particle, a change in one or more facets of a particle, a change in atomic orientation of a particle, or a combination thereof.

For example, the shape of the first metal oxide particle can change by 25% or more (e.g., 30% or more, 35% or more, 40% or more, 45% or more, 50% or more, 60% or more, 70% or more, 80% or more, or 90% or more) after heating the first metal oxide particle at a temperature of 300° C. or more (e.g., from 300° C. to 1200° C., or from 300° C. to 700° C.) for an amount of time of 5 hours or more (e.g., 48 hours or more). In some examples, the specific reversible oxygen storage capacity of the first metal oxide particle can decrease by 25% or more (e.g., 30% or more, 35% or more, 40% or more, 45% or more, 50% or more, 60% or more, 70% or more, 80% or more, or 90% or more) after heating the first metal oxide particle at a temperature of 300° C. or more (e.g., from 300° C. to 1200° C., or from 300° C. to 700° C.) for an amount of time of 5 hours or more (e.g., 48 hours or more).

The dimension(s), shape, and/or composition of the first metal oxide particle can be selected in view of a variety of factors. In some examples, the dimension(s), shape, and/or composition of the first metal oxide particle can be selected such that the first metal oxide has a desired thermal stability and/or specific reversible oxygen storage capacity.

The composite materials further comprise a second metal oxide disposed on the first metal oxide particle. For example, the composite material can comprise a first metal oxide particle having a surface that is decorated with the second metal oxide.

The second metal oxide can, for example, comprise a metal selected from the group consisting of Li, Be, Na, Mg, Al, K, Ca, Sc, Ti, V, Cr, Mn, Fe, Co, Ni, Cu, Zn, Ga, Ge, Rb, Sr, Y, Zr, Nb, Mo, Ru, Rh, Pd, Ag, Cd, In, Sn, Ab, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, Bi, and combinations thereof. In some examples, the second metal oxide can comprise a metal selected from the group consisting of Al, Ti, Zr, Hf, Nb, and combinations thereof. In some examples, the second metal oxide can comprise a metal selected from the group consisting of Al, Ti, Zr, and combinations thereof. The second metal oxide can, for example, comprise $Al_2O_3$, $TiO_2$, $ZrO_2$, $HfO_2$, $Nb_2O_5$, or a combination thereof. In some examples, the second metal oxide can comprise $Al_2O_3$. In some examples, the first metal oxide particle can comprise $CeO_2$ and the second metal oxide can comprise $Al_2O_3$. In some examples, the first metal oxide particle can comprise a rod-shaped particle comprising $CeO_2$ and the second metal oxide can comprise $Al_2O_3$.

The second metal oxide can be present in an amount of 5 wt. % or less based on the amount of the first metal oxide in the composite material (e.g., 4.75 wt. % or less, 4.5 wt. % or less, 4.25 wt. % or less, 4 wt. % or less, 3.75 wt. % or less, 3.5 wt. % or less, 3.25 wt. % or less, 3 wt. % or less, 2.75 wt. % or less, 2.5 wt. % or less, 2.25 wt. % or less, 2 wt. % or less, 1.75 wt. % or less, 1.5 wt. % or less, 1.25 wt. % or less, 1 wt. % or less, 0.75 wt. % or less, 0.5 wt. % or less, 0.25 wt. % or less, or 0.1 wt. % or less). In some examples, the second metal oxide can be present in an amount of 0.01 wt. % or more based on the amount of the first metal oxide in the composite material (e.g., 0.05 wt. % or more, 0.1 wt. % or more, 0.25 wt. % or more, 0.5 wt. % or more, 0.75 wt. % or more, 1 wt. % or more, 1.25 wt. % or more, 1.5 wt. % or more, 1.75 wt. % or more, 2 wt. % or more, 2.25 wt. % or more, 2.5 wt. % or more, 2.75 wt. % or more, 3 wt. % or more, 3.25 wt. % or more, 3.5 wt. % or more, 3.75 wt. % or more, 4 wt. % or more, 4.25 wt. % or more, or 4.5 wt. % or more). The amount of the second metal oxide can range from any of the minimum values described above to any of the maximum values described above. For example, the second metal oxide can be present in an amount of from 0.01 wt. % to 5 wt. % based on the amount of the first metal oxide in the composite material (e.g., from 0.01 wt. % to 2.5 wt. %, from 2.5 wt. % to 5 wt. %, from 0.01 wt. % to 1 wt. %, from 1 wt. % to 3 wt. %, from 3 wt. % to 5 wt. %, or from 0.05 wt. % to 4 wt. %). In some examples, the second metal oxide can be present in a sub monolayer amount.

The second metal oxide can be deposited on the first metal oxide particle by any appropriate method. For example, the second metal oxide can be deposited on the first metal oxide particle by a solution based method and/or a vapor based methods. Examples of suitable methods for depositing the second metal oxide on the first metal oxide particle include, but are not limited to, sputtering, pulsed layer deposition, molecular beam epitaxy, evaporation, atomic layer deposition, printing, lithographic deposition, electron beam deposition, thermal deposition, spin coating, drop-casting, zone casting, dip coating, blade coating, spraying, vacuum filtration, and combinations thereof. In some examples, the second metal oxide can be disposed on the first metal oxide particle via atomic layer deposition. In some examples, the first metal oxide particle can comprise $CeO_2$ and the second metal oxide can comprise $Al_2O_3$ disposed on the first metal oxide particle via atomic layer deposition. In some examples, the first metal oxide particle can comprise a rod-shaped particle comprising $CeO_2$ and the second metal oxide can comprise $Al_2O_3$ disposed on the first metal oxide particle via atomic layer deposition.

The second metal oxide can be disposed on the first metal oxide particle such that the second metal oxide does not form a continuous layer coating the surface of the first metal oxide particle. In some examples, the second metal oxide can be disposed on the first metal oxide particle as a plurality of particles comprising the second metal oxide. The plurality of particles comprising the second metal oxide can comprise a particle of any shape. The plurality of particles comprising the second metal oxide can have an irregular shape, a regular shape, an isotropic shape, an anisotropic shape, or a combination thereof. In some examples, the plurality of particles comprising the second metal oxide can have an isotropic shape. In some examples, the plurality of particles comprising the second metal oxide can have an anisotropic shape. In some examples, the plurality of particles comprising the second metal oxide can have a shape that is substantially spherical, ellipsoidal, triangular, pyramidal, tetrahedral, polygonal, cylindrical, rectangular, cuboidal, cuboctahedral, or a combination thereof.

The plurality of particles comprising the second metal oxide can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. For an anisotropic particle, the average particle size can refer to, for example, the average maximum dimension of the particle (e.g., the length of a rod shaped particle, the diagonal of a cube shape particle, the bisector of a triangular shaped particle, etc.) For an anisotropic particle, the average particle size can refer to, for example, the hydrodynamic size of the particle. Mean particle size can be measured using methods known in the art, such as evaluation by scanning electron microscopy, transmission electron microscopy, and/or dynamic light scattering.

The plurality of particles comprising the second metal oxide can have an average particle size of 0.1 nm or more (e.g., 0.5 nm or more, 1 nm or more, 1.5 nm or more, 2 nm or more, 2.5 nm or more, 3 nm or more, 3.5 nm or more, or 4 nm or more). In some examples, the plurality of particles comprising the second metal oxide can have an average particle size of 5 nm or less (e.g., 4.5 nm or less, 4 nm or less, 3.5 nm or less, 3 nm or less, 2.5 nm or less, 2 nm or less, 1.5 nm or less, or 1 nm or less). The average particle size of the plurality of particles comprising the second metal oxide can range from any of the minimum values described above to any of the maximum values described above. For example, the plurality of particles comprising the second metal oxide can have an average particle size of from 0.1 nm to 5 nm (e.g., from 0.1 nm to 2.5 nm, from 2.5 nm to 5 nm, from 0.1 nm to 4 nm, from 0.1 nm to 3 nm, from 0.1 nm to 2 nm, from 0.1 nm to 1 nm, or from 0.5 nm to 4 nm).

In some examples, the plurality of particles comprising the second metal oxide can be substantially monodisperse. "Monodisperse" and "homogeneous size distribution," as used herein, and generally describe a population of particles where all of the particles have the same or nearly the same particle size. As used herein, a monodisperse distribution refers to particle distributions in which 80% of the distribution (e.g., 85% of the distribution, 90% of the distribution, or 95% of the distribution) lies within 25% of the average particle size (e.g., within 20% of the average particle size, within 15% of the average particle size, within 10% of the average particle size, or within 5% of the average particle size).

In some examples, the plurality of particles comprising the second metal oxide can comprise: a first population of particles comprising a first material and having a first average particle size and a first particle shape; and a second population of particles comprising a second material and having a second average particle size and a second particle shape; wherein the first average particle size and the second average particle size are different, the first particle shape and the second particle shape are different, the first material and the second material are different, or a combination thereof. In some examples, the plurality of particles comprising the second metal oxide can comprise a mixture of a plurality of populations of particles, wherein each population of particles within the mixture has a different size, shape, composition, or combination thereof.

The composition of the second metal oxide; the amount of second metal oxide present in the composite material based on the amount of the first metal oxide in the composite material; the size, shape, and/or composition of the plurality of particles comprising the second metal oxide; or a combination thereof can be selected in view of a variety of factors. In some examples, the composition of the second metal oxide; the amount of second metal oxide present in the composite material based on the amount of the first metal oxide in the composite material; the size, shape, and/or composition of the plurality of particles comprising the second metal oxide; or a combination thereof can be selected such that the composite material has a thermal stability that is greater than the thermal stability of the first metal oxide particle.

As used herein, a composite material is considered to have a "greater thermal stability" than the first metal oxide particle if: (a) the shape and/or specific reversible oxygen storage capacity of the composite material changes less than that of the shape and/or specific reversible oxygen storage capacity of first metal oxide particle upon subjecting the composite material to the same heat treatment as the first metal oxide particle, e.g., upon heating the composite material and the first material at the same elevated temperature for the same amount of time; (b) the shape and/or specific reversible oxygen storage capacity of the composite material remains substantially unchanged upon heating the composite material at a higher temperature than the temperature at which the shape and/or specific reversible oxygen storage capacity of the first metal oxide particle remains substantially unchanged over the same amount of time; (c) the shape and/or specific reversible oxygen storage capacity of the composite material remains substantially unchanged upon heating the composite material for a longer time than which the shape and/or specific reversible oxygen storage capacity of the first metal oxide particle remains substantially unchanged at the same temperature; or a combination thereof.

For example, the composite material can have a shape wherein the shape of the composite material can change by 50% or less (e.g., 45% or less, 40% or less, 35% or less, 30% or less, 25% or less, 20% or less, 15% or less, 10% or less, 5% or less, 4% or less, 3% or less, 2% or less, or 1% or less) after heating the composite material at a temperature of 300° C. or more (e.g., from 300° C. to 1200° C., or from 300° C. to 700° C.) for an amount of time of 5 hours or more (e.g., 48 hours or more). In some examples, the shape of the composite material remains substantially unchanged after heating the composite material at a temperature of 300° C. or more (e.g., from 300° C. to 1200° C., or from 300° C. to 700° C.) for an amount of time of 5 hours or more (e.g., 48 hours or more). In some examples, the shape of the composite material can change by 50% or less (e.g., 45% or less, 40% or less, 35% or less, 30% or less, 25% or less, 20% or less, 15% or less, 10% or less, 5% or less, 4% or less, 3% or less, 2% or less, or 1% or less) when subjected to a heat treatment (e.g., heating at a temperature for an amount of time) that caused the shape of the first metal oxide particle to change by greater than 50%.

In some examples, the composite material can have a specific reversible oxygen storage capacity and the specific reversible oxygen storage capacity of the composite material can decrease by 50% or less (e.g., 45% or less, 40% or less, 35% or less, 30% or less, 25% or less, 20% or less, 15% or less, 10% or less, 5% or less, 4% or less, 3% or less, 2% or less, or 1% or less) after heating the composite material at a temperature of 300° C. or more (e.g., from 300° C. to 1200° C., or from 300° C. to 700° C.) for an amount of time of 5 hours or more (e.g., 48 hours or more). In some examples, the specific reversible oxygen storage capacity of the composite material remains substantially unchanged after heating the composite material at a temperature of 300° C. or more (e.g., from 300° C. to 1200° C., or from 300° C. to 700° C.) for an amount of time of 5 hours or more (e.g., 48 hours or more). In some examples, the specific reversible oxygen storage capacity of the composite material can decrease by 50% or less (e.g., 45% or less, 40% or less, 35% or less, 30% or less, 25% or less, 20% or less, 15% or less, 10% or less, 5% or less, 4% or less, 3% or less, 2% or less, or 1% or less) when subjected to a heat treatment (e.g., heating at a temperature for an amount of time) that caused the specific reversible oxygen storage capacity of the first metal oxide particle to decrease by greater than 50%.

In some examples, the specific reversible oxygen storage capacity of the composite material after heating the composite material at a temperature of 300° C. or more (e.g., from 300° C. to 1200° C., or from 300° C. to 700° C.) for an amount of time of 5 hours or more (e.g., 48 hours or more) can be greater than the specific reversible oxygen storage capacity of the first metal oxide particle after heating the first metal oxide particle at the same temperature for the same amount of time. For example, the specific reversible oxygen storage capacity of the composite material after heating the composite material at a temperature of 300° C. or more (e.g., from 300° C. to 1200° C., or from 300° C. to 700° C.) for an amount of time of 5 hours or more (e.g., 48 hours or more) can be greater than the specific reversible oxygen storage capacity of the first metal oxide particle after heating the first metal oxide particle at the same temperature for the same amount of time by 50% or more (60% or more, 70% or more, 80% or more, 90% or more, 100% or more, 150% or more, 200% or more, 250% or more, 300% or more, 400% or more, or 500% or more).

Methods of Making

Also disclosed herein are methods of making the composite materials described herein. For example, the composite materials described herein can be made by a method comprising depositing the second metal oxide on the first metal oxide particle. In some examples, the method further comprises making the first metal oxide particle. Methods of making metal oxide particles are known in the art.

Any suitable method for depositing a metal or metal oxide can be used to deposit the second metal oxide on the first metal oxide particle. For example, depositing the second metal oxide on the first metal oxide particle can comprise a solution based method and/or a vapor based method. Examples of suitable methods for depositing the second metal oxide include, but are not limited to, sputtering, pulsed layer deposition, molecular beam epitaxy, evaporation, atomic layer deposition, printing, lithographic deposition, electron beam deposition, thermal deposition, spin coating, drop-casting, zone casting, dip coating, blade coating, spraying, vacuum filtration, or combinations thereof. In some examples, the second metal oxide can be deposited on the first metal oxide particle by atomic layer deposition. For example, the second metal oxide can be deposited on the first metal oxide by 1 or more cycles of atomic layer deposition (e.g., 5 cycles or more, 10 or more cycles, 15 cycles or more, 20 cycles or more, 25 cycles or more, 30 cycles or more, 35 cycles or more, 40 cycles or more, 45 cycles or more, 50 cycles or more, 60 cycles or more, 70 cycles or more, or 80 cycles or more). In some examples, the second metal oxide can be deposited on the first metal oxide by 100 cycles or less of atomic layer deposition (e.g., 90 cycles or less, 80 cycles or less, 70 cycles or less, 60 cycles or less, 50 cycles or less, 45 cycles or less, 40 cycles or less, 35 cycles or less, 30 cycles or less, 25 cycles or less, 20 cycles or less, 15 cycles or less, or 10 cycles or less). The number of cycles of atomic layer deposition used to deposit the second metal oxide on the first metal oxide particle can range from any of the minimum values described above to any of the maximum values described above. For example, the second metal oxide can be deposited on the first metal oxide particle using from 1 to 100 cycles of atomic layer deposition (e.g., from 1 cycle to 50 cycles, from 50 cycles to 100 cycles, from 1 cycle to 20 cycles, from 20 cycles to 40 cycles, from 40 cycles to 60 cycles, from 60 cycles to 80 cycles, from 80 cycles to 100 cycles, or from 10 cycles to 80 cycles). The number of cycles of atomic layer deposition used to deposit the second metal oxide on the first metal oxide particle can be selected in view of a variety of factors, such as the desired amount of second metal oxide present in the composite material based on the amount of the first metal oxide in the composite material.

Methods of Use

Also disclosed herein are methods of use of the composite materials described herein. For example, the composite materials described herein can be used as a catalyst. The composite materials described herein can, for example, be used as a catalyst for CO oxidation, water-gas shift reaction, thermal water splitting, diesel root oxidation, chemical looping, or a combination thereof.

In some examples, the composite materials described herein can be used as an oxygen carrier. In some examples, the composite materials described herein can be used as a catalyst support.

Also disclosed herein are articles of manufacture comprising the composite materials described herein. Examples of articles of manufacture include, for example, fuel cells and catalyst converters.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in °C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Metal oxides (e.g., $CeO_2$, $MoO_3$, $Fe_2O_3$, $TiO_2$, and $V_2O_5$) have reversible oxygen storage capacities (OSCs), i.e., the ability to shuttle oxygen between reduction and oxidation environments (Yao. *J. Catal.* 1981, 70, 440-444; Montini et al. *Chem. Rev.* 2016, 116, 5987-6041; Li et al. *Energ Fuel* 2017, 31, 3475-3524). Cerium oxide ($CeO_2$) has an exceptionally large oxygen storage capacity and redox capability (Montini et al. *Chem. Rev.* 2016, 116, 5987-6041). Although cerium is a rare-earth element, cerium has a relatively high concentration (0.0046 wt. %) in the earth crust and is relatively low-cost ($5/1 kg Ce in 2016). Owing to its large specific oxygen storage capacity, redox capability, and low-cost, $CeO_2$ has been used and explored as a catalyst or catalyst support in various applications, e.g., three-way catalysts (TWC) on catalytic converters on cars, fluid catalytic cracking, catalytic oxidation of soot from diesel engines, solid oxide fuel cells, etc. For all of these applications, a need exists for improving the reducibility of $CeO_2$ while maintaining its thermal stability.

The oxygen storage capacity of $CeO_2$ originates from its surface and bulk. The oxidation of reduced ceria ($Ce_2O_3 + O_2 \rightarrow CeO_2$) is fast. The reduction of $CeO_2$ is generally sluggish. The reducibility of ceria depends strongly on its specific surface area, surface facets and defects, and oxygen diffusion in the bulk of ceria (Zhou et al. *J. Catal.* 2005, 229, 206-212; Wu et al. *Langmuir* 2010, 26, 16595-16606; Trovarelli et al. *Acs Catalysis* 2017, 7, 4716-4735; Aneggi et al. *Acs Catalysis* 2014, 4, 172-181; Esch et al. *Science* 2005, 309, 752-755). Surface oxygen is more active and can be activated (reduced) at lower temperatures than the bulk oxygen. As measured by temperature-programmed-reduction (TPR) by $H_2$, a majority of surface oxygen species can be consumed below 600° C. (Yao et al. *J. Catal.* 1984, 86, 254-265). The specific surface oxygen storage capacity (ssOSC) of $CeO_2$ depends strongly on the specific surface area and surface atomic structure (surface facets and defects) (Montini et al. *Chem. Rev.* 2016, 116, 5987-6041; Zhou et al. *J. Catal.* 2005, 229, 206-212). Shape-engineered $CeO_2$ nanorods (NRs) display a larger specific surface oxygen storage capacity than other types $CeO_2$ materials (Zhou et al. *J. Catal.* 2005, 229, 206-212; Mai et al. *J. Phys. Chem. B* 2005, 109, 24380-24385). The large specific surface oxygen storage capacity of $CeO_2$ nanorods can be attributed to: (i) the high density of [100] and [110] facets, which are more reducible than [111] facets (Zhou et al. *J. Catal.* 2005, 229, 206-212; Mai et al. *J. Phys. Chem. B* 2005, 109, 24380-24385); and (ii) the high density of defects contributing to reducible surface oxygen (Aneggi et al. *Acs Catalysis* 2014, 4, 172-181). The facile reducibility of surface oxygen in the $CeO_2$ nanorods can be desirable for improving the chemical conversions in many of the above-mentioned applications (Montini et al. *Chem. Rev.* 2016, 116, 5987-6041; Trovarelli et al. *Acs Catalysis* 2017, 7, 4716-4735; Jones et al. *Science* 2016, 353, 150-154). However, the applications of the $CeO_2$ nanorods are currently limited due to the difficulties in extracting their bulk oxygen.

The bulk oxygen contains the majority of reducible oxygen species in $CeO_2$ materials, including the shape-engineered $CeO_2$ nanorods. The reducibility of bulk oxygen is determined by the oxygen diffusion in the bulk of ceria, which is related to oxygen vacancy clusters. For the pure $CeO_2$, a majority of bulk oxygen species start to be reduced at temperatures higher than 700° C. However, the $CeO_2$ nanorods lose their low temperature reducible surface oxygen (Wu et al. *Langmuir* 2010, 26, 16595-16606; Aneggi et al. *Acs Catalysis* 2014, 4, 172-181; Jones et al. *Science* 2016, 353, 150-154) at temperatures of ~500° C. because the $CeO_2$ nanorods transform their shape into more thermally stable octahedrons and aggregate. The low thermal stability of the $CeO_2$ nanorods is due to the transformation of [100] and [110] surface facets to [111]. The surface is more stable than the [100] and [110] surfaces, but is also much less reducible according to the theoretical calculations (Baudin et al. *Surf. Sci.* 2000, 468, 51-61; Nolan et al. *Surf. Sci.* 2005, 576, 217-229). Therefore, there is a need to improve the thermal stability of the $CeO_2$ nanorods so as to extract their bulk oxygen and maintain the high reducibility of their surface oxygen.

Surface diffusion of atoms and migration of bulk defects are two mechanisms that can contribute to the thermally-induced structural transformation of nanomaterials (Fan et al. *Nano Lett.* 2007, 7, 993-997; Shi et al. *J Mater Sci* 2005, 40, 5711-5719). These deformation pathways can potentially be blocked by surface modification with thermally stable oxides, e.g., $Al_2O_3$. Fluid catalytic cracking operates at 800° C. or below (Vogt et al. *Chemical Society Reviews* 2015, 44, 7342-7370; Trovarelli et al. *Catal. Today* 1999, 50, 353-367) and solid oxide fuel cells are often operated at 700° C. or below (Ding et al. *Energy Environ. Sci.* 2014, 7, 552-575). In these applications, $Al_2O_3$ can improve the thermal stability and oxygen reducibility of $CeO_2$ nanomaterials, including $CeO_2$ nanorods, if $Al_2O_3$ can be controllably added onto the surface of $CeO_2$ nanorods without significantly blocking their active surface sites.

Figure 1B:
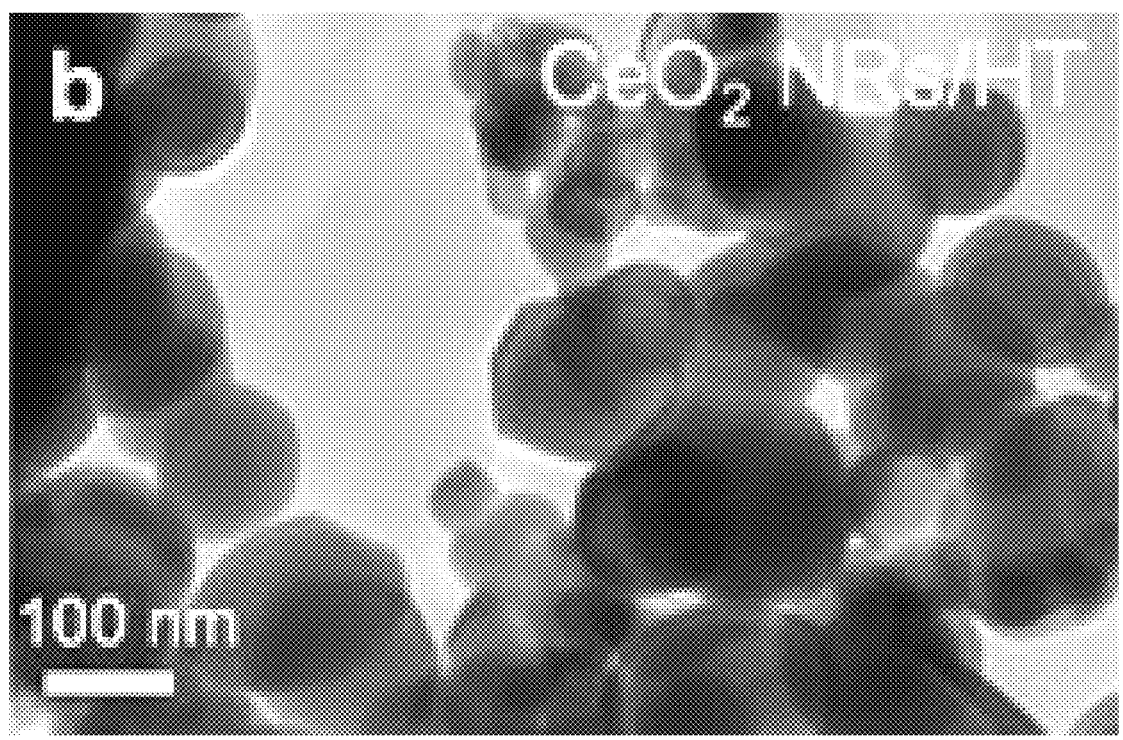

FIG. 1A-FIG. 1H are transmission electron microscopy (TEM) images of various samples. FIG. 1A is a TEM image of pristine $CeO_2$ nanorods and FIG. 1B a TEM of the sample shown in FIG. 1A after heat treatment at 700° C. in $N_2$ for 5 h (HT). According to FIG. 1A and FIG. 1B, shape-engineered $CeO_2$ nanorods are not thermally stable. FIG. 1A clearly shows the rod shape of $CeO_2$ nanorods, while FIG. 1B shows that $CeO_2$ nanorods lose their rod shapes and transform into $CeO_2$ octahedral particles after heat treatment at 700° C. in $N_2$ for 5 h.

Figure 1C:
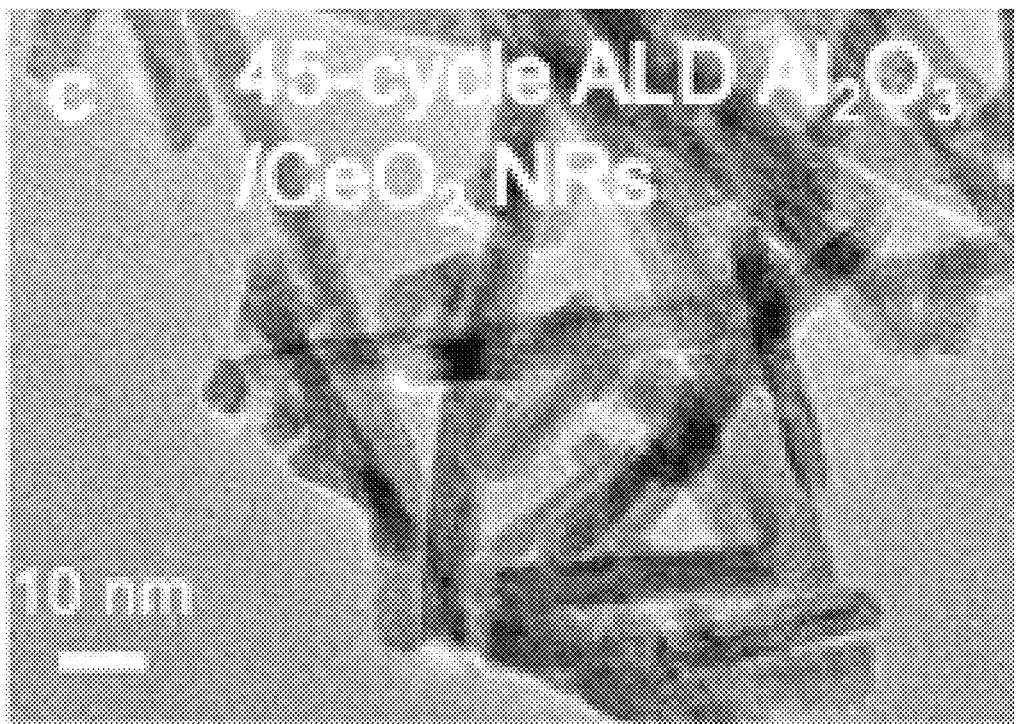
Figure 1D:
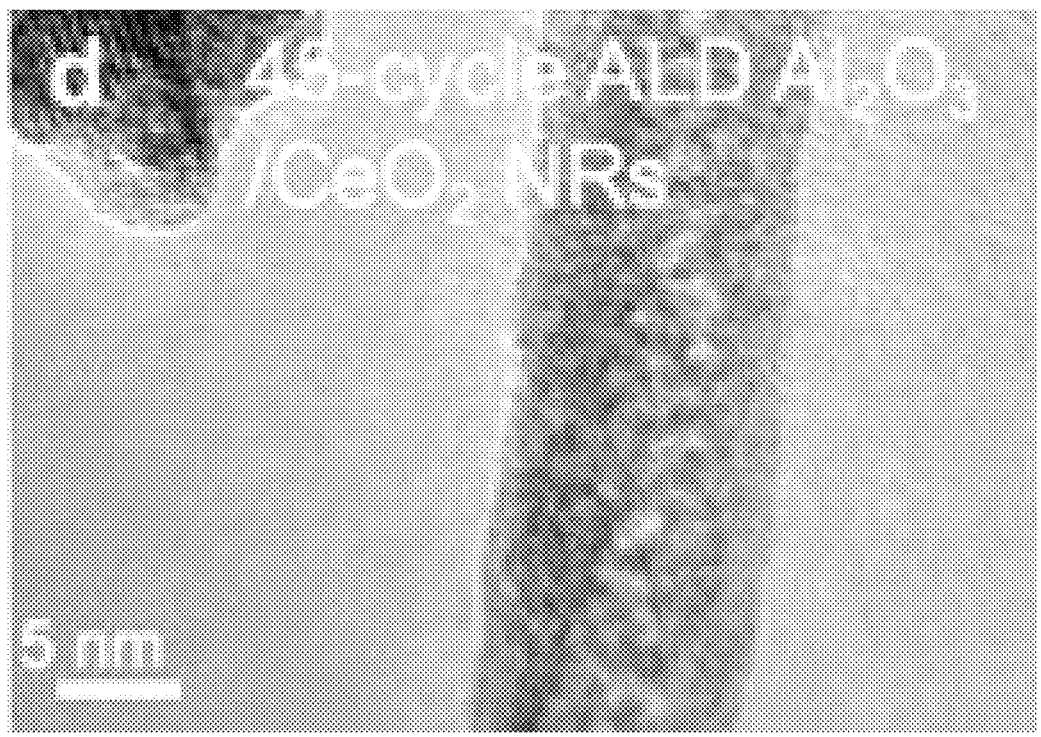
Figure 1E:
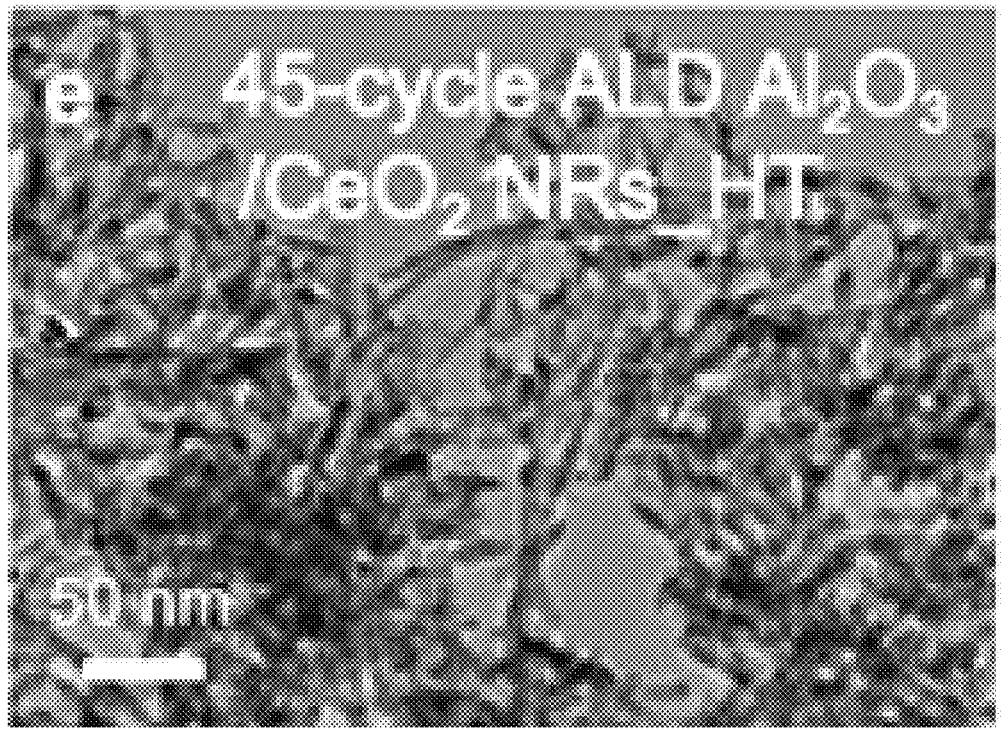
Figure 1F:
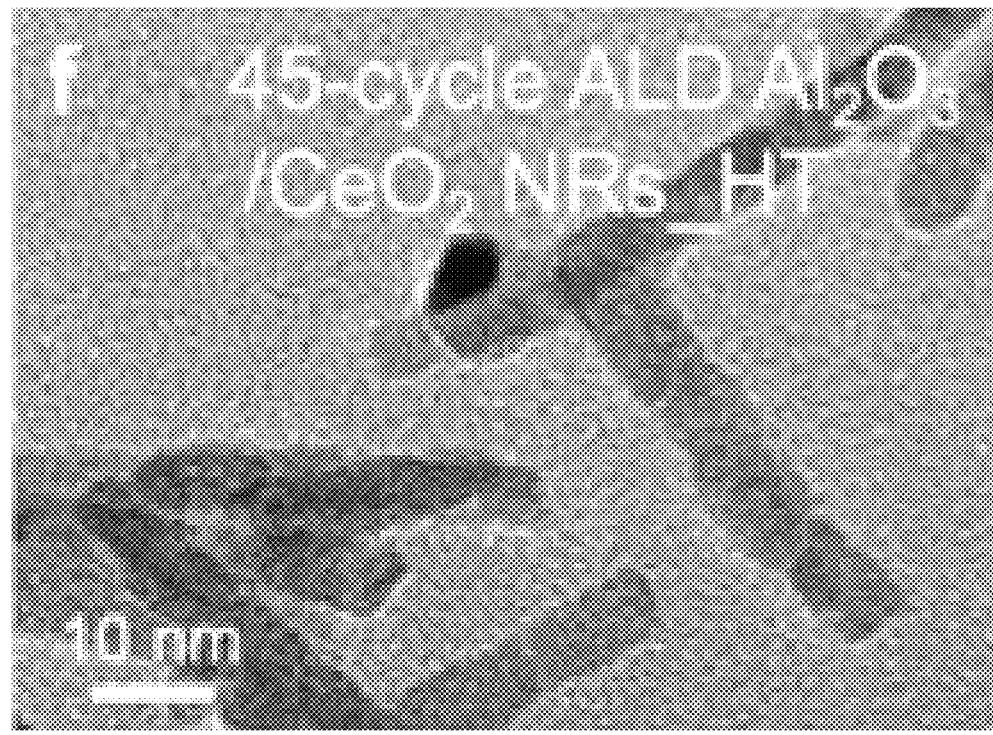

FIG. 1C and FIG. 1D are TEM images of the $CeO_2$ nanorods after 45-cycle ALD $Al_2O_3$. ALD $Al_2O_3$ was carried at 200° C. with trimethyl aluminum $[Al(CH_3)_3]$ and $H_2O$ as the reactants. As shown in FIG. 1C and FIG. 1D, the $CeO_2$ nanorods maintain their shapes after 45-cycle ALD $Al_2O_3$. The amount of $Al_2O_3$ on $CeO_2$ nanorods is small for 45-cycle ALD $Al_2O_3$/$CeO_2$ nanorods samples. On a Si wafer 45 cycles $Al_2O_3$ ALD (~1 Å/cycle) with the native oxide at 200° C. forms a layer about 4.5 nm thick. However, the 45 cycle $Al_2O_3$ ALD did not form a conformal $Al_2O_3$ shell of 4.5 nm, as will be discussed further below. FIG. 1E-FIG. 1F are TEM images of the 45-cycle ALD $Al_2O_3$/$CeO_2$ nanorods after heat treatment at 700° C. in $N_2$ for 5 h, and it can be seen that the 45-cycle ALD $Al_2O_3$/$CeO_2$ nanorods maintain their shape after heat treatment at 700° C. in $N_2$ for 5 h.

Figure 1G:
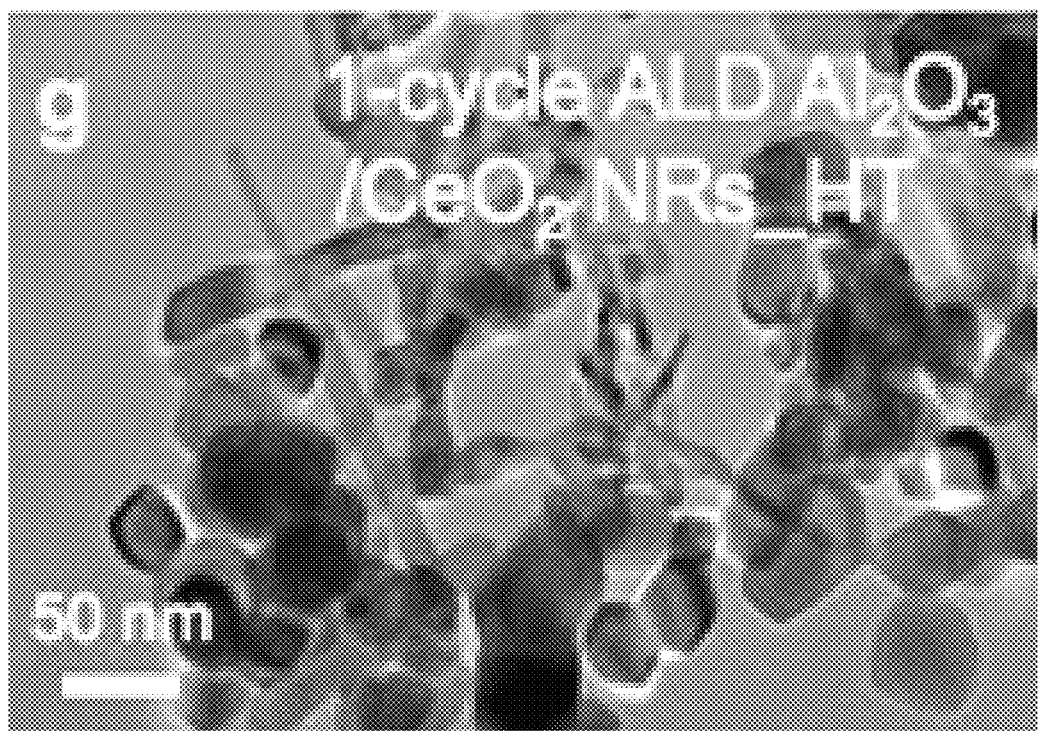
Figure 1H:
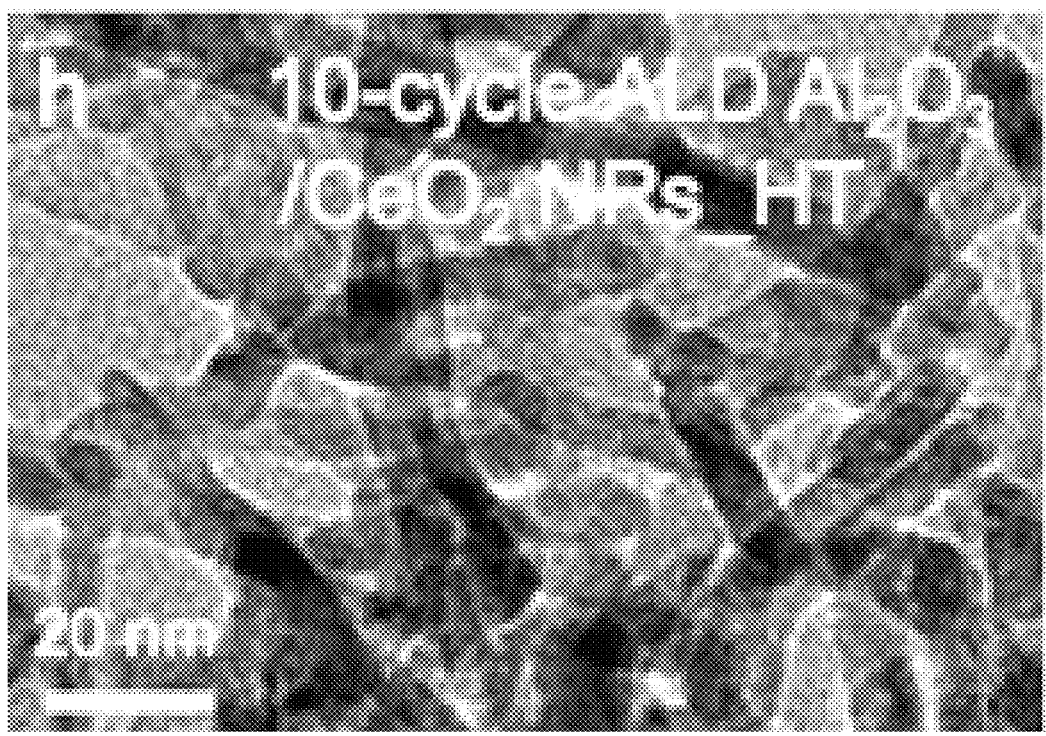

Samples of $CeO_2$ nanorods treated with fewer cycles of $Al_2O_3$ ALD were similarly tested for their thermal shape stability. FIG. 1G is a TEM image of a 1-cycle ALD $Al_2O_3$/$CeO_2$ nanorod sample after heat treatment at 700° C. in $N_2$ for 5 h. FIG. 1H is a TEM image of a 10-cycle ALD $Al_2O_3$/$CeO_2$ nanorod sample after heat treatment at 700° C. in $N_2$ for 5 h. As demonstrated in FIG. 1E-FIG. 1H, the $CeO_2$ nanorods maintain their nanorod shape after heating at 700° C. This is in sharp contrast with the deformation of the uncoated $CeO_2$ nanorods induced by heat treatment at 700° C. in $N_2$ for 5 h (FIG. 1B). $CeO_2$ nanorods maintained their rod-like shapes at heat treatment at 700° C. in $N_2$ for 5 h even with only 10 cycle ALD $Al_2O_3$, while the bare $CeO_2$ nanorods (i.e. in the absence of ALD $Al_2O_3$) lost their rod shape at heat treatment at 700° C. in $N_2$ for 5 h. Therefore, the decoration of the $CeO_2$ nanorods with $Al_2O_3$ improved the thermal stability of the morphology of the $CeO_2$ nanorods.

Figure 2:
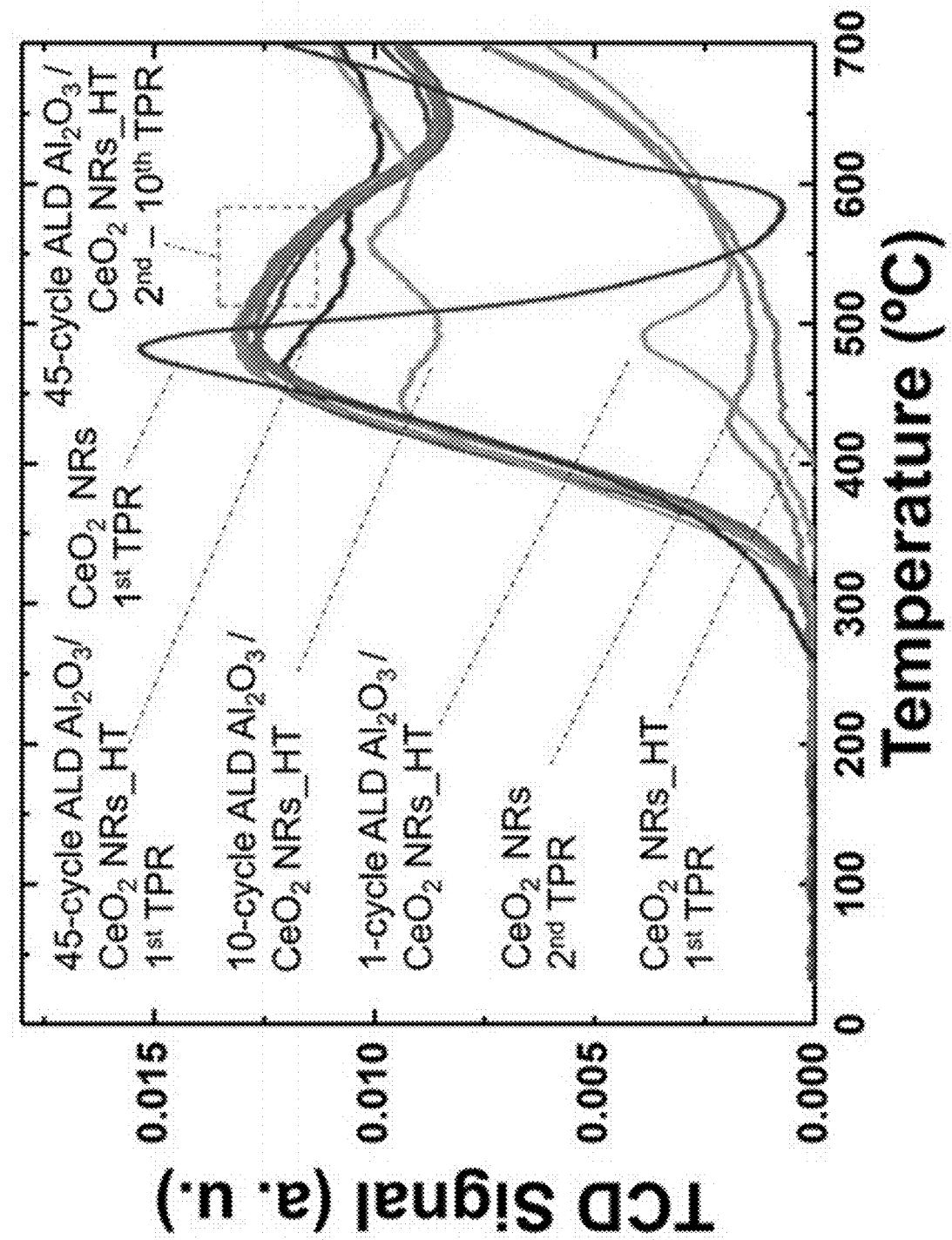
FIG. 2 shows the thermal conductivity detector (TCD) signals measured in various cycles of temperature programmed reduction under $H_2$ (TPR-$H_2$) for pristine $CeO_2$ NRs, $CeO_2$ NRs_HT, and n-cycle $Al_2O_3$ ALD/$CeO_2$ NRs_HT in various cycles of temperature programmed reduction under $H_2$ (TPR-$H_2$). All TCD signals are normalized to the weight of the sample. The low temperature peak at ~480° C. is from surface oxygen. The area underneath a curve is a measure of oxygen storage capacity of samples. The reduction of bulk oxygen from $CeO_2$ nanorods has a peak located at >700° C. The temperature ramping rate is 10° C./min.

FIG. 2 shows the thermal conductivity detector (TCD) signal of pristine $CeO_2$ NRs, $CeO_2$ NRs_HT, and n-cycle $Al_2O_3$ ALD/$CeO_2$ NRs_HT in various cycles of temperature-programmed-reduction with hydrogen (TPR-$H_2$). Pristine $CeO_2$ nanorods (e.g., $CeO_2$ nanorods without any $Al_2O_3$ treatment) have a large specific surface oxygen storage capacity as indicated by thermal conductivity detector (TCD) signals in the first temperature-programmed-reduction ($1^{st}$ TPR) in FIG. 2. The specific surface oxygen storage capacity is dramatically reduced by the first temperature-programmed-reduction (up to 700° C. in $H_2$) as indicated by the second temperature-programmed-reduction ($2^{nd}$ TPR) of $CeO_2$ nanorods shown in FIG. 2. In addition, heat treatment at 700° C. in $N_2$ for 5 h dramatically reduces specific surface oxygen storage capacity of $CeO_2$ nanorods as shown by $CeO_2$ NRs_HT $1^{st}$ TPR in FIG. 2. According to these results, the reducibility of the specific surface oxygen storage capacity of pristine $CeO_2$ nanorods is diminished with 700° C. annealing in $O_2$ or $H_2$.

As can be seen in FIG. 2, 45-cycle ALD $Al_2O_3$/$CeO_2$ NRs_HT has a larger area that is underneath the curve (500-600° C.) than the pristine $CeO_2$ nanorods. This result means that ALD $Al_2O_3$ generates a large amount of oxygen species that can be reduced at temperatures between 500° C. and 600° C., as $Al_2O_3$ and $AlCeO_3$ do not have oxygen shuttling capability at this temperature range. The reducibility of 45-cycle ALD $Al_2O_3$/$CeO_2$ NRs_HT is stable in the $1^{st}$-$10^{th}$ temperature-programmed-reduction cycles (FIG. 2). This difference of stability suggests that the 45-cycle ALD $Al_2O_3$ treatment prevents the loss of the specific surface oxygen storage capacity of the $CeO_2$ nanorods. Further, the stability of the specific surface oxygen storage capacity of the 45-cycle ALD $Al_2O_3$/$CeO_2$ NRs_HT suggests that its specific surface oxygen storage capacity can be replenished in air, therefore, it can be cycled between reduction and oxidation environments up to 700° C. without dramatically losing its specific surface oxygen storage capacity. In addition, the 45-cycle ALD $Al_2O_3$/$CeO_2$ NRs_HT has a much larger stable specific surface oxygen storage capacity than $CeO_2$ nano-octahedra that are generated from the deformation of $CeO_2$ nanorods (see $CeO_2$ NRs_HT $1^{st}$ TPR and $CeO_2$ NRs $2^{nd}$ TPR in FIG. 2).

The specific surface oxygen storage capacity of n-cycle ALD $Al_2O_3$/$CeO_2$ NRs_HT increases with ALD cycle number (n=1, 10, and 45) (FIG. 2). The 45-cycle $Al_2O_3$ ALD treatment removes some of the original surface oxygen species of $CeO_2$, as shown by the lower height of the peak at ~500° C. in FIG. 2. This means that $Al_2O_3$ ALD growth covers some of the surface oxygen sites, but does not significantly block the $CeO_2$ nanorods. According to these results, ALD $Al_2O_3$ has a different nucleation behavior on $CeO_2$ nanorods than the steady-state growth behavior of $Al_2O_3$ and surface reaction chemistry during ALD involves the surface oxygen species on $CeO_2$. Based on the results from FIG. 2, the surface decoration of the $CeO_2$ nanorods with $Al_2O_3$ improves the reducibility of the $CeO_2$ nanorods as well as the thermal stability of the reducibility.

Figure 3A:
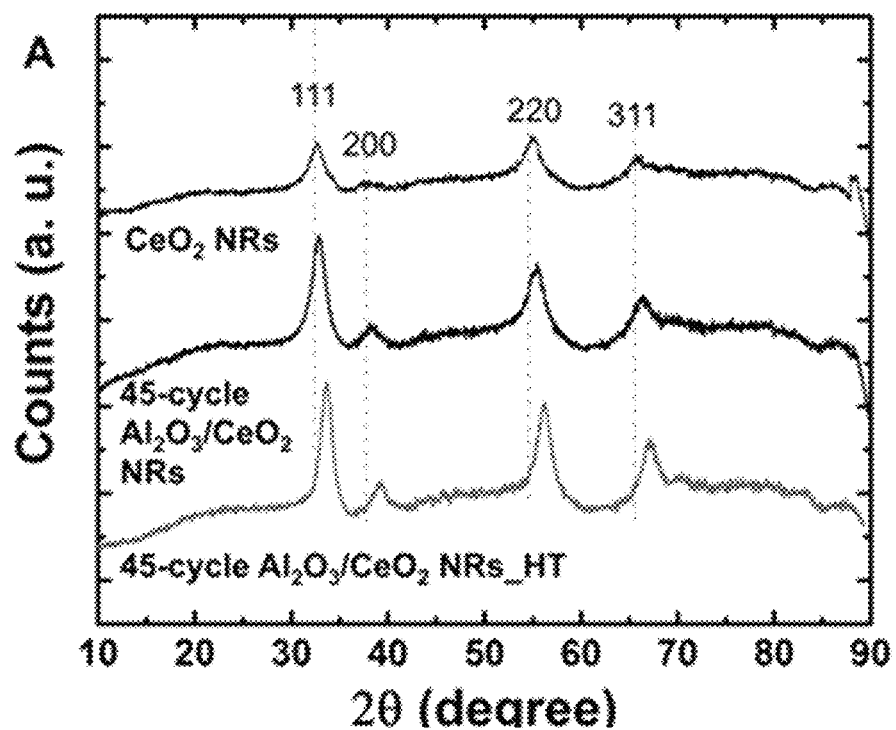
FIG. 3A shows the X-ray diffraction (XRD) of $CeO_2$ NRs, 45-cycle $Al_2O_3$ ALD/$CeO_2$ NRs, and 45-cycle $Al_2O_3$ ALD/$CeO_2$ NRs_HT. The peaks of $CeO_2$ shift to lower 2theta after the heat treatment at 700° C. in $N_2$ for 5 h. The X-ray source is Co kα radiation (0.179 nm).
Figure 3B:
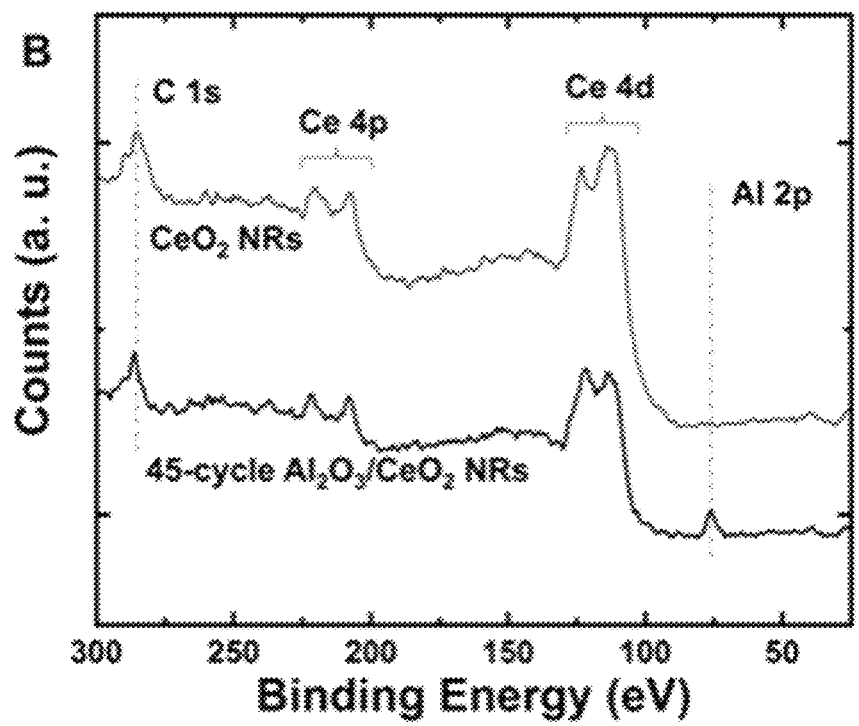
FIG. 3B shows the XPS spectra of $CeO_2$ NRs and 45-cycle $Al_2O_3$ ALD/$CeO_2$ NRs. Al2p is clearly observed after 45 cycles of $Al_2O_3$ and Ce peaks are also visible.
Figure 5A:
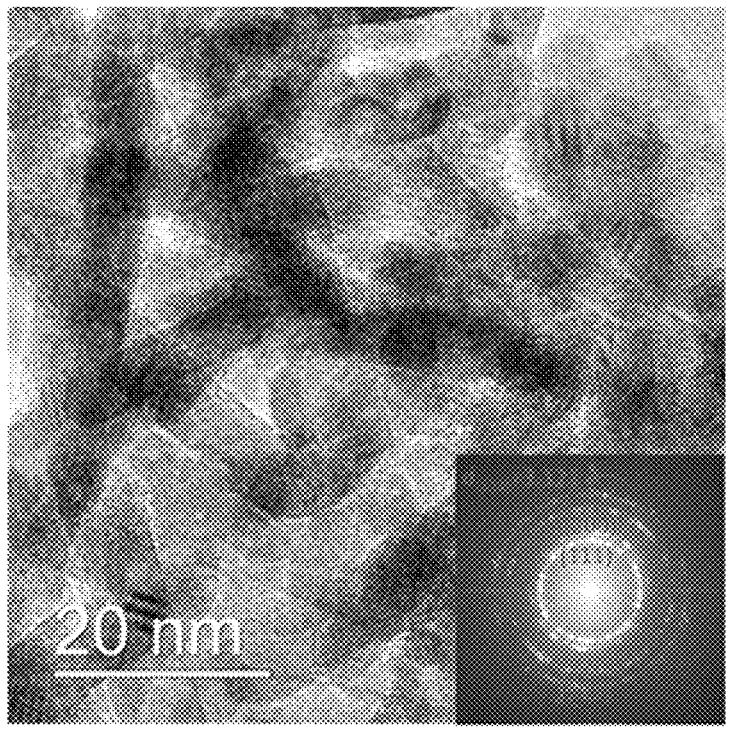
FIG. 5A and FIG. 5B are TEM images and the diffraction patterns of 45-cycle $Al_2O_3$—$CeO_2$ nanorods (FIG. 5A) and 45-cycle $Al_2O_3$ ALD/$CeO_2$ NRs_HT (FIG. 5B). The diffraction patterns show that the thermal treatment reduces the atomic lattice size of the $CeO_2$ nanorods. This result is consistent with the peak shift in the XRD data in FIG. 3A.
Figure 5B:
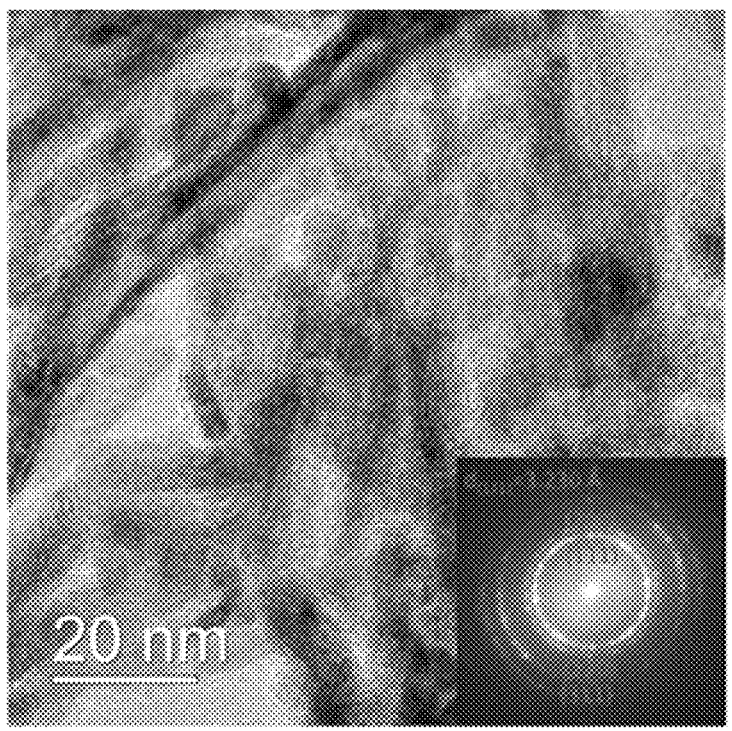

FIG. 3A shows the XRD spectra of $CeO_2$ NRs, 45-cycle $Al_2O_3$ ALD/$CeO_2$ NRs, and 45-cycle $Al_2O_3$ ALD/$CeO_2$ NRs_HT. FIG. 3B shows the XPS spectra of $CeO_2$ NRs and 45-cycle $Al_2O_3$ ALD/$CeO_2$ NRs. As measured in the XRD data (FIG. 3A), the full width half maximum (FWHM) of the (111) peak is the same for $CeO_2$ nanorods before and after the ALD $Al_2O_3$ treatment, which suggests the crystal sizes are similar for both samples. The FWHM of the (111) peak is smaller for the sample after heat treatment at 700° C. in $N_2$ for 5 h than the sample with only ALD treatment, which suggests that the crystal size increases with heat treatment at 700° C. in $N_2$ for 5 h (FIG. 3A). This is consistent with the diffraction patterns of the 45-cycle $Al_2O_3$—$CeO_2$ nanorod before (FIG. 5A) and after (FIG. 5B) the thermal annealing. $Al_2O_3$ ALD treatment causes the mixing of $Al^{3+}$ into $CeO_2$, as all four $CeO_2$ peaks shift to a higher 2theta numbers in FIG. 3A, and this shift increased after heat treatment at 700° C. in $N_2$ for 5 h, suggesting that heat treatment at 700° C. in $N_2$ for 5 h drives the mixing reaction further. In the XPS data in FIG. 3B, the Ce signals are still very clear even after 45 cycles of ALD $Al_2O_3$. According to FIG. 3A and FIG. 3B, Al is doped into $CeO_2$ after ALD $Al_2O_3$ and heat treatment at 700° C. in $N_2$ for 5 h, but did not cause the formation of $AlCeO_3$.

Figure 4A:
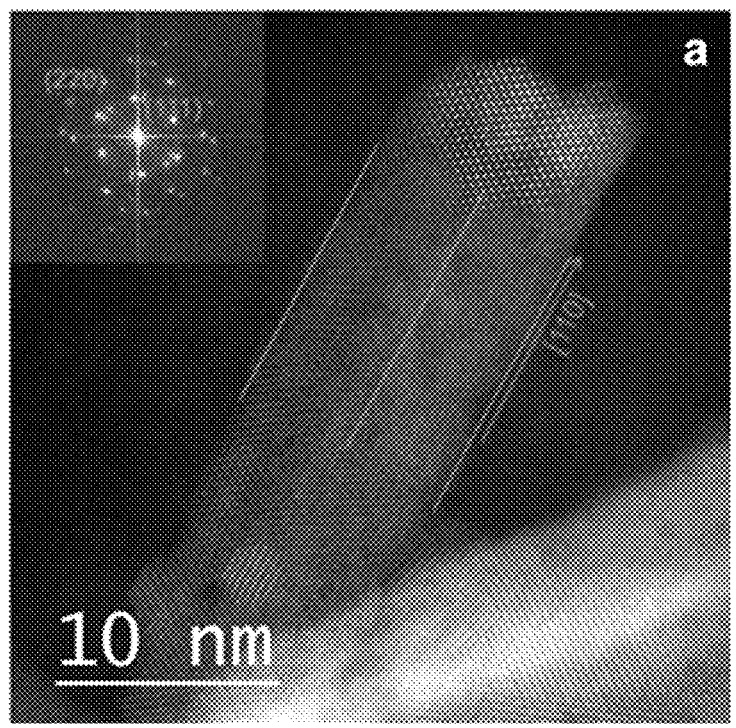
FIG. 4A-FIG. 4D are high-resolution TEM (HRTEM) images of fresh $CeO_2$ nanorods before (FIG. 4A and FIG. 4B) and after 45-cycle $Al_2O_3$ ALD (FIG. 4C and FIG. 4D). The inset figure in FIG. 4A shows the corresponding Fourier transform image of the $CeO_2$ nanorod. The arrow in FIG. 4A illustrates the [110] direction of $CeO_2$ nanorods.
Figure 4B:
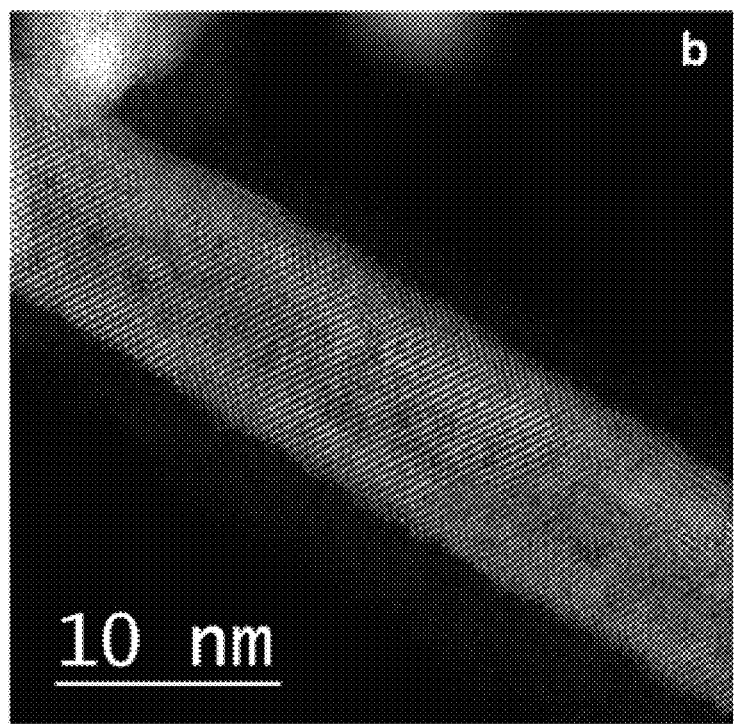

FIG. 4A and FIG. 4B are high resolution transmission electron microscopy (HRTEM) images of fresh, pristine $CeO_2$ nanorods. FIG. 4A and FIG. 4B show that $CeO_2$ nanorods grow along the [110] direction with side surfaces of (100) and (110). As shown by the HRTEM images in FIG. 4A and FIG. 4B, $CeO_2$ nanorods are well crystallized without high temperature annealing and before the ALD coating. The $CeO_2$ nanorods have many surface defects, as can be seen in FIG. 4A and FIG. 4B. These surface defects can accommodate oxygen vacancies, as revealed by the larger lattice parameter than the standard 5.411 Å (FIG. 4A and FIG. 4B). The (100) and (110) surface facets and defects sites along the $CeO_2$ nanorods can be the reason for the low temperature hydrogen reduction peaks, as shown in FIG. 2.

Figure 4C:
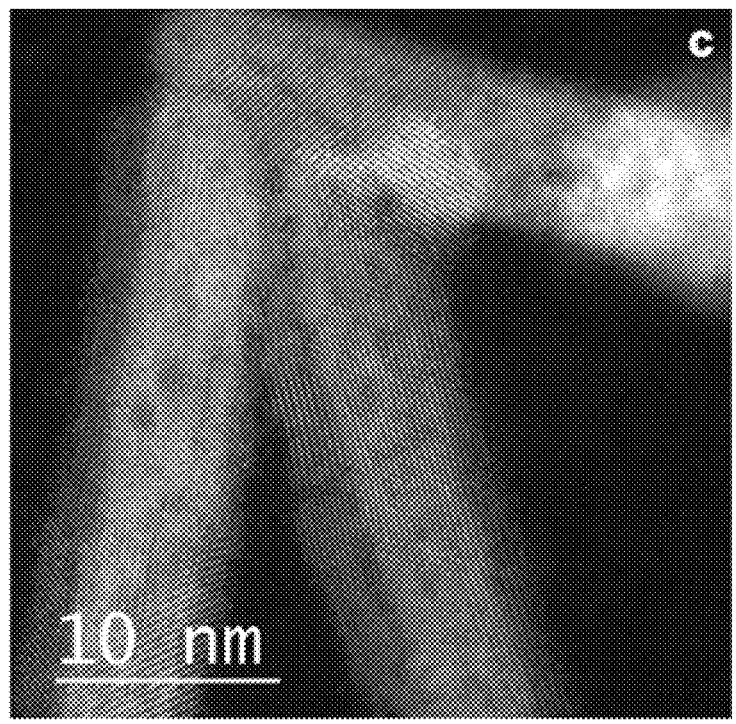
Figure 4D:
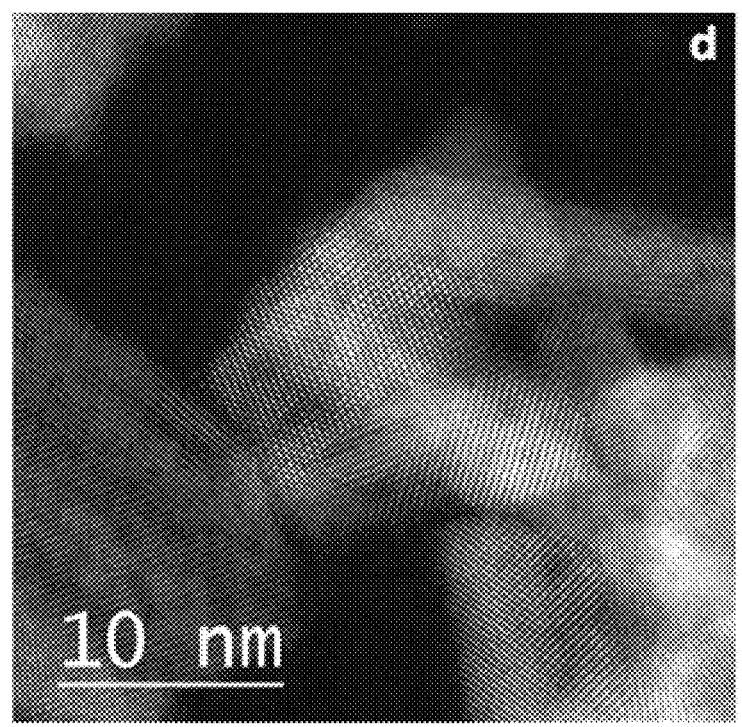
Figure 6:
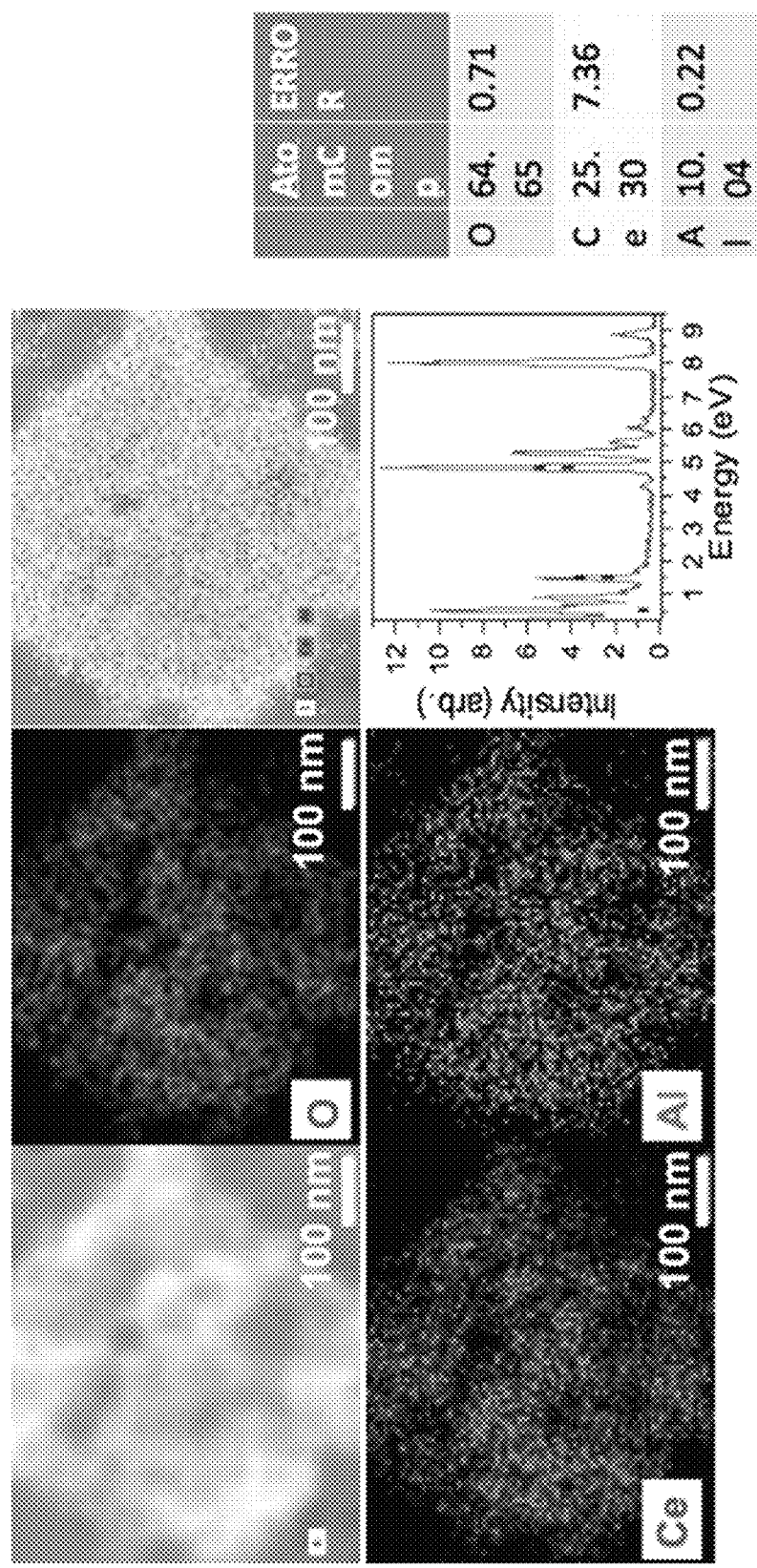
FIG. 6 shows the EDX element mapping of 45-cycle $Al_2O_3$ ALD/$CeO_2$ nanorods. It shows that Al is distributed over the samples.

FIG. 4C and FIG. 4D are HRTEM images of the $CeO_2$ nanorods after 45-cycle $Al_2O_3$ ALD. FIG. 4C and FIG. 4D show that the $Al_2O_3$ coatings do not dramatically change the crystal structure of $CeO_2$ nanorods. The HRTEM images in FIG. 4C and FIG. 4D show the $CeO_2$ nanorods still maintain [110] as the main axis and (100) and (110) as the surface facets along the side of the nanorods. Along the $CeO_2$ nanorods after 45-cycle $Al_2O_3$ ALD, there is no obvious amorphous $Al_2O_3$ coating (FIG. 4C and FIG. 4D). This is surprising because 45 cycles of $Al_2O_3$ ALD was performed onto the $CeO_2$ nanorods, which was expected to produce an $Al_2O_3$ coating of 4.5 nm. The XPS measurement show a clear Al peak (FIG. 3B). In addition, EDX of the $CeO_2$ nanorods (FIG. 6) after 45 cycles of $Al_2O_3$ ALD unambiguously shows Al signal. Based on these results, the growth of $Al_2O_3$ on $CeO_2$ nanorods is likely to be different from the steady-state growth behavior of $Al_2O_3$ and the nucleation of $Al_2O_3$ on $CeO_2$ is likely delayed. This kind of growth behavior is unexpected as trimethyl aluminum (TMA) is a strong Lewis acid and can grow readily on various substrates. This unique growth phenomenon can be ascribed to the surface reactions.

Figure 7A:
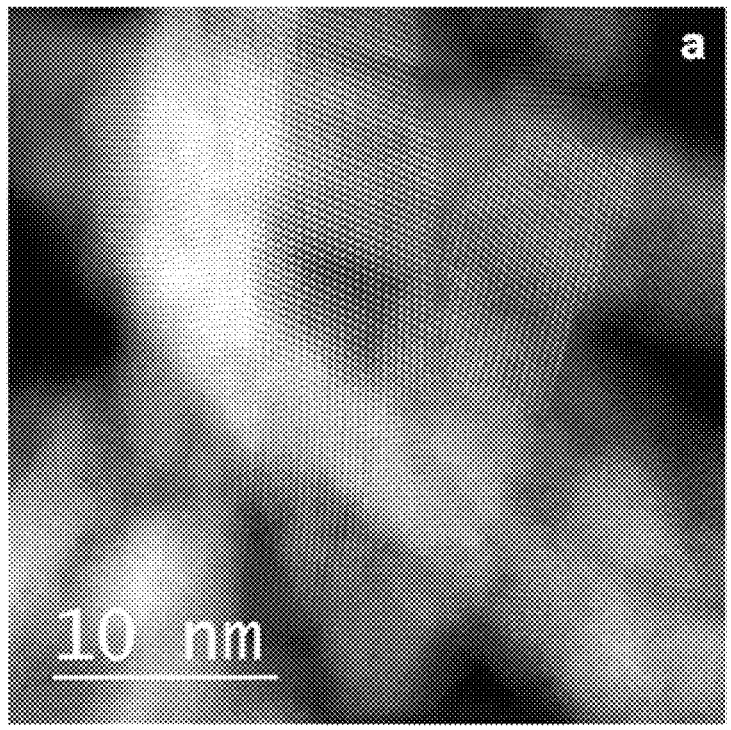
FIG. 7A-FIG. 7C are HRTEM images of 45-cycle ALD $Al_2O_3/CeO_2$NRs_HT.
Figure 7B:
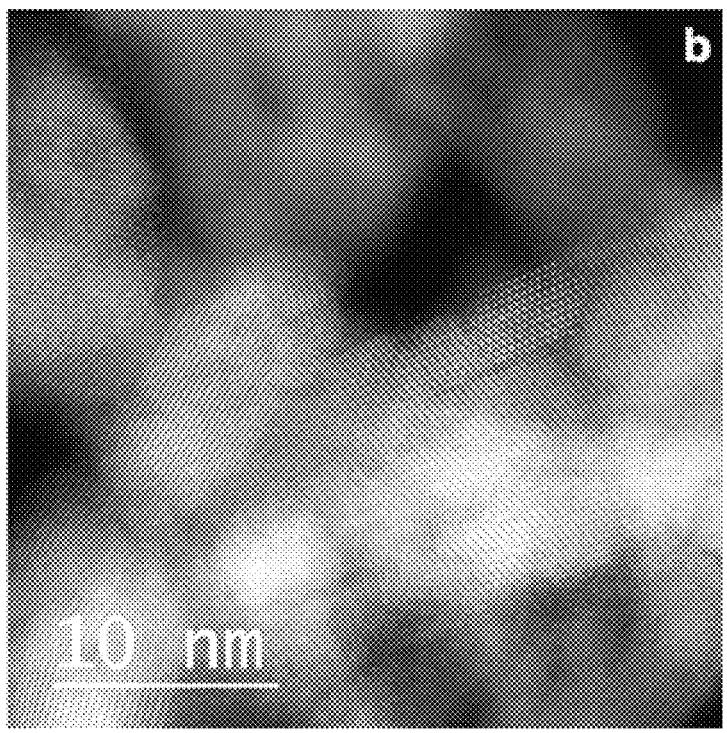
Figure 7C:
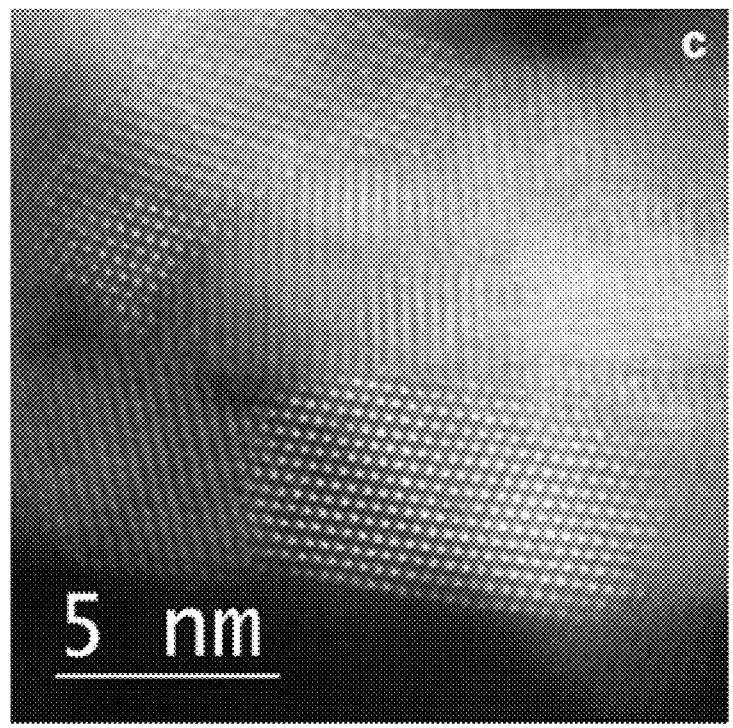
Figure 7D:
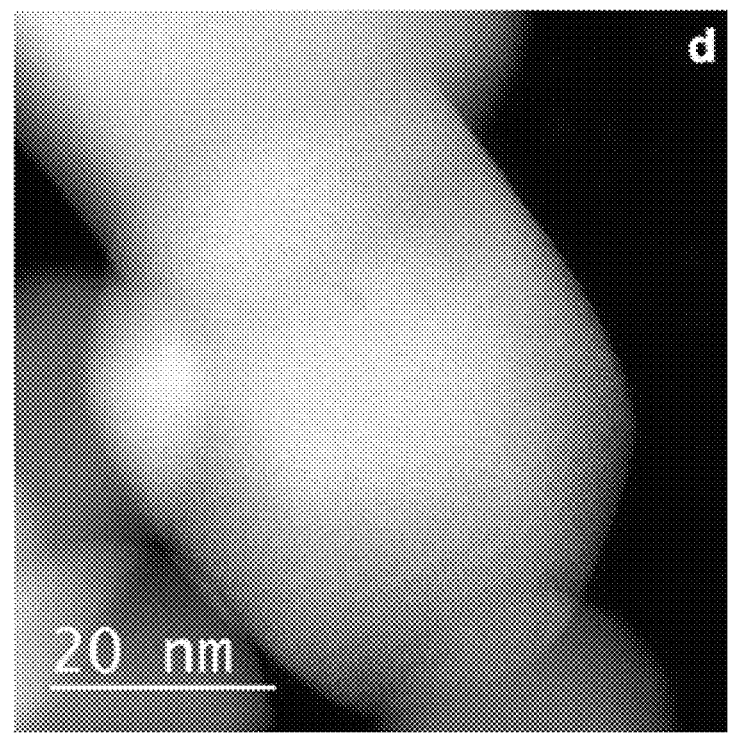
FIG. 7D is a HRTEM image of $CeO_2$ NRs_HT.
Figure 8:
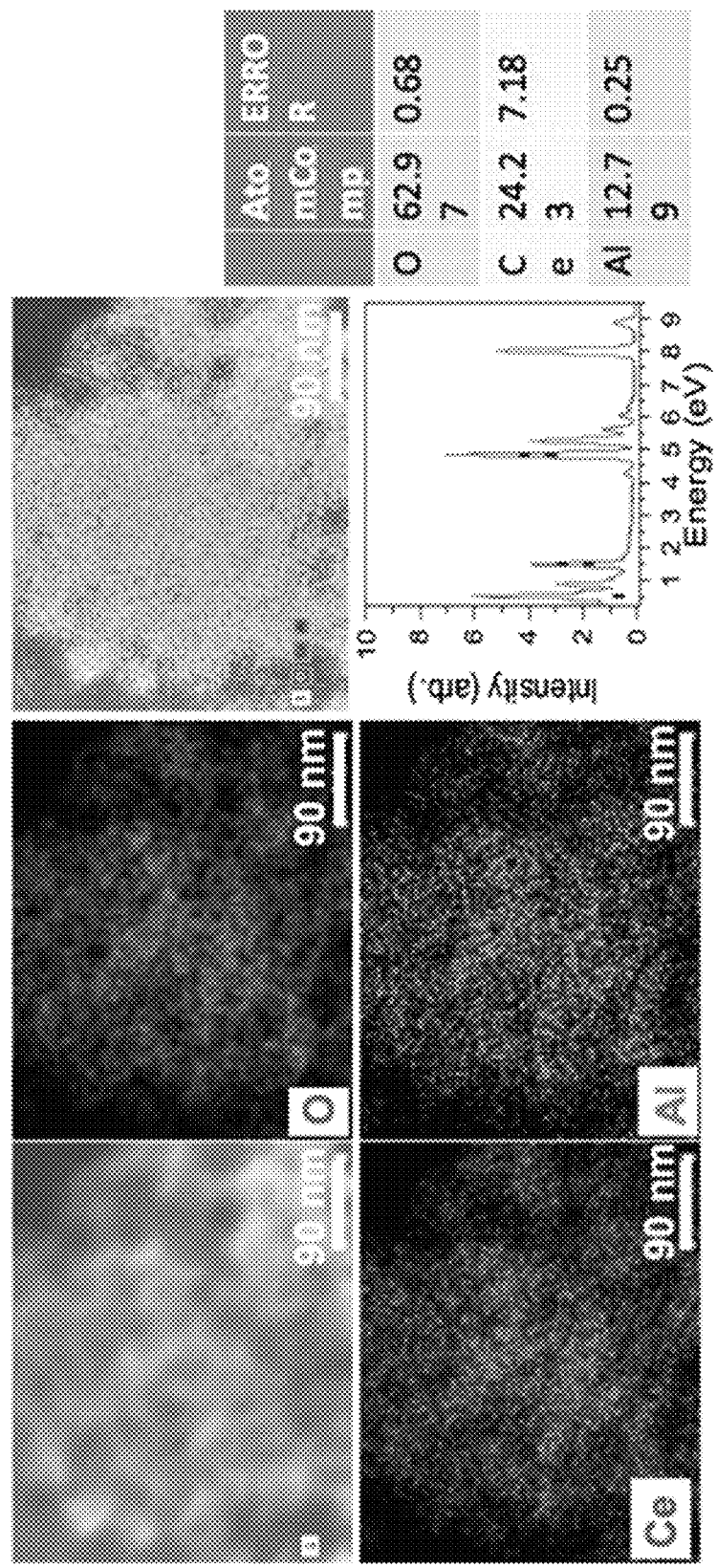
FIG. 8 shows the EDX element mapping of 45-cycle $Al_2O_3$ ALD/$CeO_2$ NRs_HT. It shows that Al is distributed over the samples.

FIG. 7A-FIG. 7C are HRTEM images of 45-cycle ALD $Al_2O_3/CeO_2NRs\_HT$ and FIG. 7D is a HRTEM image of $CeO_2$ NRs_HT. FIG. 7A-FIG. 7C show that high temperature annealing reduces the defects in 45-cycle ALD $Al_2O_3/CeO_2$ nanorods, but does not change their nanorod morphology. In contrast, the high temperature annealing transforms $CeO_2$ nanorods into $CeO_2$ nanoparticles (FIG. 7D). As shown in FIG. 7A-FIG. 7C, the shape of nanorods is largely maintained for 45-cycle ALD $Al_2O_3/CeO_2NRs\_HT$ sample. The 45-cycle ALD $Al_2O_3/CeO_2NRs\_HT$ sample have nanostructures with diameters less than 10 nm and the surfaces of these nanorods become sharper upon annealing. The EDX data shows that the 45-cycle ALD $Al_2O_3/CeO_2NRs\_HT$ sample has uniformly distributed Al atom on nanometer scale (FIG. 8), which indicates that Al is mixed with $CeO_2$. The annealing also produces nanoparticles, which also have sharp surfaces. In sharp contrast, $CeO_2NRs\_HT$ sample mainly consists of large nanoparticles, as shown by FIG. 7D. These large particles result from the aggregation of $CeO_2$ nanorods, owing to the surface diffusion of Ce, O and O vacancy. These nanoparticles have their main surface facets of (111), which is thermodynamically more stable than (110) and (100) facets. This shape transformation is consistent with the significant loss of the low temperature surface reducibility of $CeO_2$ (FIG. 2), because it is difficult to reduce the (111) surface at low temperatures.

Figure 9:
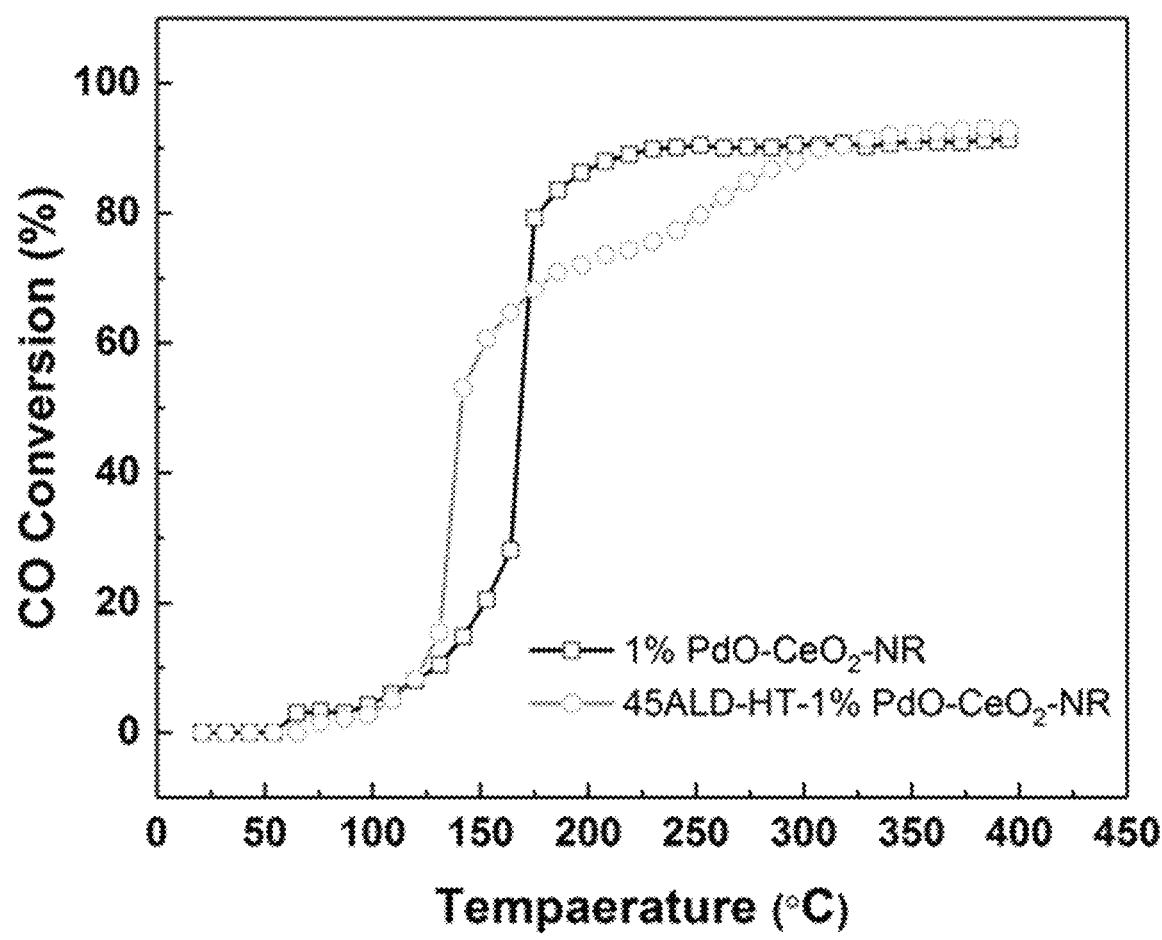
FIG. 9 shows the ignition temperature of the CO oxidation by 1% of PdO on $CeO_2$ nanorods and 1% of PdO on $CeO_2$ nanorods, which are treated by 45 cycles of $Al_2O_3$ ALD followed by thermal annealing at 700° C.

FIG. 9 shows the ignition temperature of the CO oxidation by 1% of PdO on $CeO_2$ nanorods and 1% of PdO on $CeO_2$ nanorods, which are treated by 45 cycles of $Al_2O_3$ ALD followed by thermal annealing at 700° C. FIG. 9 shows that after thermal annealing, 1% PdO dispersed on $CeO_2$ nanorods (1% PdO—$CeO_2$ NRs) coated with 45 cycles of $Al_2O_3$ ALD is still active and has a lower ignition temperature of the CO oxidation than the 1% PdO—$CeO_2$ NRs without ALD and high temperature annealing. The ignition temperature is at ~150° C. for the sample of 1% PdO—$CeO_2$ NRs (FIG. 9). In contrast, the ignition temperature of the sample after $Al_2O_3$ ALD-HT treatment is ~125° C. (FIG. 9). It takes a high temperature for the $Al_2O_3$ ALD-HT catalyst to achieve 100% conversion of CO. This is due to the covered Pd catalyst by $Al_2O_3$ ALD process.

Figure 10:
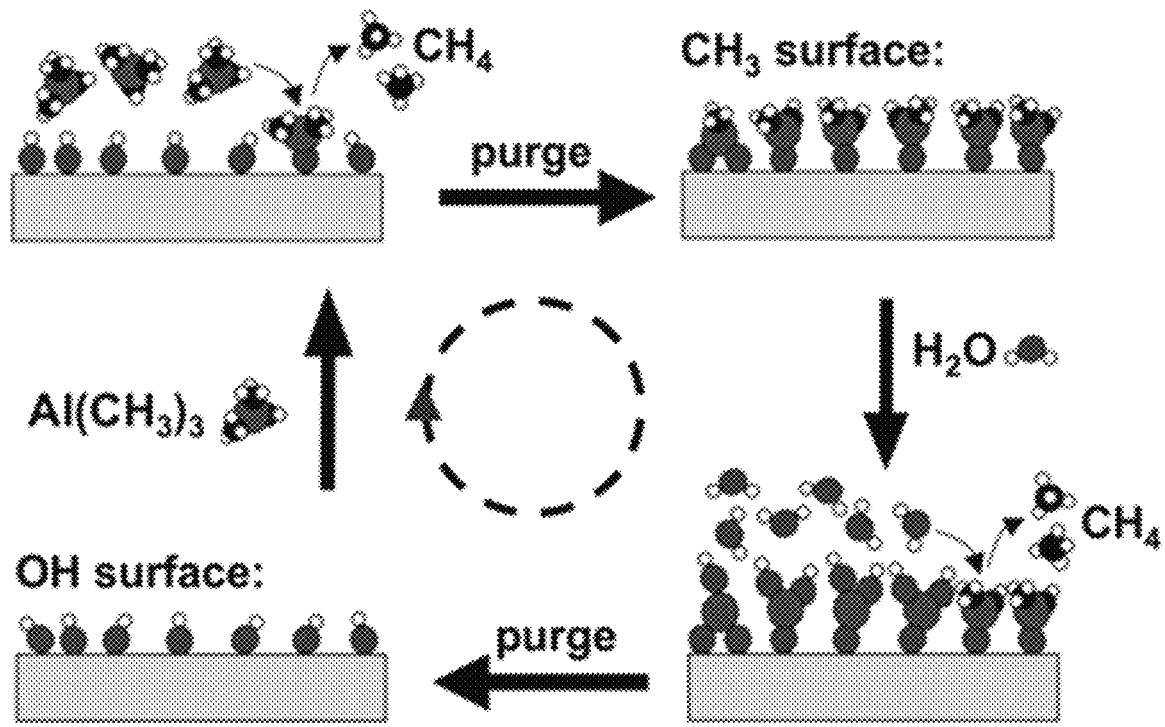
FIG. 10 is a simplified scheme of $Al_2O_3$ ALD process with $Al(CH_3)_3/H_2O$ on a —OH containing substrate (e.g., Si with native oxide). Surface coating is built through the surface site limited reactions (SSLRs) from $Al(CH_3)_3$ and $H_2O$. Purge steps eliminate homogeneous reactions.

According to the principle of ALD (FIG. 10), it is the surface chemistry of $CeO_2$ (i.e., the oxygen species) that delays the nucleation of ALD $Al_2O_3$. As shown in FIG. 10, $Al_2O_3$ coating can be built up through sequential surface-site limited reactions (SSLRs) (George. Chem. Rev. 2010, 110, 111-131; Peng et al. Journal of Vacuum Science & Technology A 2012, 30, 010803; Puurunen. J. Appl. Phys. 2005, 97, 121301; Zaera et al. J. Phys. Chem. Lett. 2012, 3, 1301-1309). ALD growth takes place only at surface sites that can react with ALD reactants. When the substrate surface is uniformly populated with —OH groups, e.g., Si with native oxide and polyvinyl alcohol (Peng et al. Nano Lett. 2007, 7, 719-722), $Al_2O_3$ ALD can conformly nucleate onto the substrate surface to form an $Al_2O_3$ film. The amount of ALD materials deposited can be selected by adjusting ALD cycle number.

Example 2

The underlying surface reaction chemistry in selective atomic layer deposition (ALD) of oxides on $CeO_2$ nanorods (NRs), and thermal stability and specific surface oxygen storage capacitance (ssOSC) of ALD oxide/$CeO_2$ nanorods is discussed herein. Owing to its large specific surface oxygen storage capacitance and low-cost, $CeO_2$ has been used/explored as a catalyst or a catalyst support in various energy applications, e.g., three-way catalysts (TWC), solid oxide fuel cells, oxidation of diesel soot, and thermal water splitting (Jones et al. Science 2016, 353, 150-154). In comparison with other $CeO_2$ nanostructures (e.g., nanooctahedra), $CeO_2$ nanorods have a larger specific surface oxygen storage capacitance, which can be desirable for these practical applications. However, the $CeO_2$ nanorods lose their high specific surface oxygen storage capacitance at temperatures of 500° C. or above, under which these processes operate, because the $CeO_2$ nanorods transform into octahedral nanoparticles. Surface diffusion of atoms and bulk defects migration are two possible mechanisms for thermally-induced structural transformation of nanomaterials (Fan et al. Nano Lett. 2007, 7, 993-997; Shi et al. J Mater Sci 2005, 40, 5711-5719).

The oxygen storage capacitance (OSC) of $CeO_2$ originates from its surface and bulk. Surface oxygen is more active and can be activated at lower temperatures than the bulk oxygen. For instance, in temperature-programmed-reduction (TPR) of $CeO_2$ by $H_2$, a majority of surface oxygen species can be consumed at ~500° C., while majority of bulk oxygen starts to be consumed at temperature higher than 700° C. (Yao et al. J. Catal. 1984, 86, 254-265). The specific surface OSC (ssOSC) depends strongly on its specific surface area and surface chemistry, and therefore on the size, shape (surface chemistry and defects), and composition (chemistry, surface chemistry, and defects) of a $CeO_2$ sample (Montini et al. Chem. Rev. 2016, 116, 5987-6041; Zhou et al. J Catal. 2005, 229, 206-212). For $CeO_2$ of a similar structure, specific surface oxygen storage capacitance increases with increasing specific surface area. For $CeO_2$ of different structures, their surface facets and chemistry strongly affect their specific surface oxygen storage capacitance. $CeO_2$ nanorods (NRs) display a 3-times higher specific surface oxygen storage capacitance than $CeO_2$ nanooctahedral particles that have a higher specific surface area than nanorods. The high specific surface oxygen storage capacitance of $CeO_2$ nanorods can be due to: a higher density of [100] and [110] facets (Zhou et al. J. Catal. 2005, 229, 206-212), which are more reducible than [111] facets, therefore have higher oxygen storage capacitance values; and/or the higher density of defects, which contribute to reducible surface oxygen species.

Thermally stable $CeO_2$ nanorods with a high specific surface oxygen storage capacitance can also be used at high temperatures to improve reaction kinetics of chemical conversions, e.g., three-way catalysts (TWC), solid oxide fuel cells, oxidation of diesel soot, and thermal water splitting (Jones et al. Science 2016, 353, 150-154). However, there is no effective method to simultaneously improve specific surface oxygen storage capacitance and thermal stability of $CeO_2$ nanorods.

Although, the mechanism underlying the shape change of $CeO_2$ nanorods is not well-understood, there is evidence indicating that the deformation of $CeO_2$ nanorods starts with surface migration of under-coordinated Ce atoms. The thermal stability of $CeO_2$ nanorods can be improved, without dramatically sacrificing its specific surface oxygen storage capacitance, if these under-coordinated and less-stable sites can be selectively passivated to thereby increase the energy barrier for surface diffusion, and therefore suppress the deformation of $CeO_2$ nanorods. To date, there are few reports of improving thermal stability of nanomaterials by suppressing surface diffusion of atoms through selectively modification of the materials surface.

To implement this concept, the suitable surface passivation of $CeO_2$ nanorods must use a material that can selectively bond with certain surface sites, be thermally-stable, help stabilize $CeO_2$, and does not significantly reduce specific surface oxygen storage capacitance of $CeO_2$ nanorods. $Al_2O_3$ has been used as a support for $CeO_2$ in various high temperature applications (e.g., TWCs) (Montini et al. Chem. Rev. 2016, 116, 5987-6041; Yao et al. J. Catal. 1984, 86, 254-265). $Al_2O_3$ nanoparticles can potentially suppress the aggregation of $CeO_2$ octahedral nanoparticles (Morikawa et al. Appl. Catal. B-Environ. 2008, 78, 210-221).

The challenge is to selectively add $Al_2O_3$ onto the surface of $CeO_2$ nanorods without significantly blocking active surface sites for specific surface oxygen storage capacitance. This requires a selective surface chemistry that can modify certain surface sites of $CeO_2$ with monolayer control. Atomic layer deposition (ALD) is a good fit for this purpose. In an ALD process, films, coatings, or surface functionalization can be built up through sequential surface-site limited reactions (SSLRs). FIG. 10 shows the principle of the ALD process (George. Chem. Rev. 2010, 110, 111-131; Peng et al. Journal of Vacuum Science & Technology A 2012, 30, 010803; Puurunen. J Appl. Phys. 2005, 97, 121301; Zaera. J. Phys. Chem. Lett. 2012, 3, 1301-1309). In the situation shown in FIG. 10, the substrate surface is uniformly populated with —OH groups, e.g., Si with native oxide. $Al_2O_3$ ALD can conformably nucleate onto the substrate surface to form an $Al_2O_3$ film. ALD growth takes place only at surface sites that can react with ALD reactants. Therefore, ALD coatings can be selectively added onto $CeO_2$ nanorods by controlling the location of reactive sites on $CeO_2$ nanorods, e.g., by controllably removing surface —OH groups on $CeO_2$ and controlling surface facets and defects. Further, can control the amount of functionalization, which can affect the amount of surface diffusion and shape transformation inhibition, can be controlled by adjusting the ALD cycle number.

As described herein, ALD $Al_2O_3$ not only improves thermal stability of $CeO_2$ nanorods but also increases their specific surface oxygen storage capacitance. The surface of $CeO_2$ nanorods can be selectively decorated by ALD $Al_2O_3$, which can increase the specific surface oxygen storage capacitance by forming new surface species and can improve the thermal stability of the $CeO_2$ nanorods by suppressing and blocking surface diffusion of atoms of $CeO_2$.

Based on temperature-programmed-reduction by $H_2$ in FIG. 2, four phenomena were observed: First, the specific surface oxygen storage capacitance (up to 600° C.) of 45-cycle ALD $Al_2O_3/CeO_2$ NRs_HT is higher than pristine $CeO_2$ nanorods. This higher specific surface oxygen storage capacitance can be due to the new surface oxygen species on 45-cycle ALD $Al_2O_3/CeO_2$ NRs. Second, the specific surface oxygen storage capacitance of n-cycle ALD $Al_2O_3/CeO_2$ NRs_HT increases with ALD cycle number (n=1, 10, and 45). The peaks in TCD signal curves change with ALD cycles (FIG. 2). These results indicate the amount and types of surface species changes with ALD cycles. Third, pristine $CeO_2$ nanorods have a lower take-off temperature of temperature-programmed-reduction than ALD $Al_2O_3/CeO_2$ NRs, which again indicates surface of n-cycle ALD $Al_2O_3/CeO_2$ NRs_HT is different than $CeO_2$ nanorods. Fourth, the specific surface oxygen storage capacitance of 45-cycle ALD $Al_2O_3/CeO_2$ NRs_HT is stable in the $1^{st}$-$10^{th}$ temperature-programmed-reduction cycles (up to 700° C.) (FIG. 2). In contrast, the specific surface oxygen storage capacitance of pristine $CeO_2$ nanorods is reduced dramatically by only one temperature-programmed-reduction cycle, as indicated by TCD signals from $1^{st}$ and $2^{nd}$ temperature-programmed-reduction (FIG. 2). In addition, heat treatment at 700° C. in $N_2$ for 5 h (HT) reduces the specific surface oxygen storage capacitance of $CeO_2$ nanorods (FIG. 2). This difference of stability suggests that 45-cycle ALD $Al_2O_3$ prevents the loss of the specific surface oxygen storage capacitance of $CeO_2$ nanorods. More importantly, the stability of specific surface oxygen storage capacitance of 45-cycle ALD $Al_2O_3/CeO_2$ NRs_HT suggests that its specific surface oxygen storage capacitance can be replenished in air, therefore, it can be cycled between reduction and oxidation environment without losing its specific surface oxygen storage capacitance.

45-cycle ALD $Al_2O_3/CeO_2$NRs_HT has a better thermal stability than $CeO_2$ nanorods. TEM analyses show that 45 cycles $Al_2O_3$ ALD did not form a conformal $Al_2O_3$ shell around nanorods. Inductively coupled plasma-atomic emission spectroscopy (ICP-OES) measurement shows the amount of Al is much less than calculated value by assuming 4.5 nm shell, as $Al_2O_3$ ALD growth rate at 200° C. is ~1 Å/cycle on a Si wafer with native oxide. $Al_2O_3$ ALD selectively decorates on $CeO_2$ nanorods, and the selectively decorated $Al_2O_3$ maintains the nanorod shape after heat treatment at 700° C. in $N_2$ for 5 h. In contrast, pristine $CeO_2$ nanorods aggregate into nano-octahedral particles under such conditions.

These results show that 45-cycle ALD $Al_2O_3/CeO_2$NRs have a larger specific surface oxygen storage capacitance and better thermal stability than $CeO_2$ nanorods. The ALD $Al_2O_3$ coating can selectively bond to certain surface sites on $CeO_2$ nanorods and this selective site-passivation can improve the thermal stability and specific surface oxygen storage capacitance of $CeO_2$ nanorods by suppressing surface diffusion of atoms and creating new surface species. These species could be Ce/Al complexes sitting at perimeters of $Al_2O_3$ passivation.

The underlying mechanism can be investigated by examining the surface chemistry and microstructures of n-cycle ALD $Al_2O_3/CeO_2$ nanorods, including the amount and location of $Al_2O_3$, morphology of the coated nanorods, and the interface between the coating and $CeO_2$ nanorods. In the nucleation stage of ALD (i.e., before the surface of $CeO_2$ is fully covered by the ALD coating), the surface chemistry and microstructure of n-cycle ALD $Al_2O_3/CeO_2$ changes with ALD cycles. The catalytic activity and thermal stability of n-cycle ALD $Al_2O_3/CeO_2$ nanorods supported metal nanoparticles can be studied with CO oxidation (Jones et al. *Science* 2016, 353, 150-154; Fu et al. *Science* 2003, 301, 935-938), which can show the effect of interaction between $Al_2O_3$ ALD/$CeO_2$ nanorods and metal nanoparticles on the thermal stability of metal nanoparticles. Further, the selective growth of $TiO_2$ and $ZrO_2$ via ALD on $CeO_2$ nanorods and the resulting properties of these materials, e.g., specific surface oxygen storage capacitance, thermal stability, and property as catalyst supports, can be investigated.

The surface chemistry and microstructures of n-cycle ALD $Al_2O_3/CeO_2$ nanorods evolve with ALD cycle number. The growth of ALD oxide can depend on the $CeO_2$ nanorods surface chemistry, ALD chemistry, and temperature. In the nucleation stage, surface reactions of ALD oxide on $CeO_2$ nanorods change after each ALD step because ALD relies on sequential surface-site limited reactions. ALD oxide could selectively grow on certain surface sites, e.g., facets and edges of $CeO_2$ nanorods, and surface oxygen species.

It is challenging to fully understand nucleation of an ALD oxide on nanorods, as nanorods have complex surface chemistries. Nanostructures with better defined surface chemistries, including $CeO_2$ nanocubes, nanooctahedra with [111] surface facets, truncated nanooctahedra with [001] and [111] facets, nanorods with [110] facets, and amorphous, can be used as model substrates to help understand the nucleation of an ALD oxide on $CeO_2$ nanorods. These nanostructures can be synthesized by tuning the reaction chemistry, temperature, duration, and additives in the hydrothermal synthesis process. Post synthesis annealing can be used to study the selectively removal of —OH groups from $CeO_2$ and in situ diffuse reflectance infrared Fourier transform spectroscopy (Drifts) can be used to monitor the dehydration process (Yu et al. *The Journal of Physical Chemistry A* 2017, 121, 1169-1174). Morphology (e.g., size, surface facets, and defects), specific surface area, and specific surface oxygen storage capacitance of $CeO_2$ nanostructures can be characterized by TEM, XRD, BET, and temperature-programmed-reduction/temperature programmed oxidation (TPR/TPO). Diffuse reflectance infrared Fourier transform spectroscopy with probing molecules (e.g., pyridine, CO, $CH_3$—CN, and $CHCl_3$) can be used to probe surface sites (Wu et al. *Journal of Physical Chemistry C* 2015, 119, 7340-7350). For instance, IR measurement of CO adsorption can differentiate [110] and [111] facets of $CeO_2$. XPS can analyze surface composition and their oxidation states. N-cycle ALD $Al_2O_3/CeO_2$ can then be synthesized with the various $CeO_2$ nanostructures described above. XPS can analyze the oxidation status of Al and Ce. IR absorption of probing molecules can show chemistry and relative amount of surface sites. The change of peak ratio ($2170\ cm^{-1}$ vs. $2150\ cm^{-1}$) from chemisorbed CO with cycles (n) can show if ALD $Al_2O_3$ selectively bonds with [110] or [111]. Pyridine adsorption can determine the type and amount of surface acid sites (e.g., $Al^{3+}$ and $Ce^{4+}$). Diffuse reflectance infrared Fourier transform spectroscopy of chemisorbed $CH_3$—CN and $CHCl_3$ can probe the type and relative amount of surface base sites (0) (Wu et al. *Journal of Physical Chemistry C* 2015, 119, 7340-7350).

Scanning TEM-EELs can be used to analyze location and morphology of Al species on n-cycle ALD $Al_2O_3/CeO_2$ at the atomic-level, which can indicate where ALD $Al_2O_3$ starts nucleating. ICP-OES can show the atomic ratio between ALD oxide metal and Ce of the whole sample. The measured Al/Ce ratios vs. cycle number can show if the surface reaction in ALD is selective. Al/Ce ratios can also show the effect of $CeO_2$ facets on nucleation of ALD $Al_2O_3$ by using different $CeO_2$ nanostructures as substrates. XPS can analyze the atomic ratio between Al/Ce and oxidation state and can show if there is surface etching reaction. The surface reaction chemistry in the nucleation of ALD $Al_2O_3$ on $CeO_2$ nanostructures can be examined by using in situ IR, quadrupole mass spectrometry (QMS), and quartz crystal microbalance (QCM). IR can show the change of chemical composition of $CeO_2$ (e.g., surface oxygen species and —OH) after surface-site limited reactions in ALD $Al_2O_3$. Quadrupole mass spectrometry can provide the chemical identity of gaseous byproducts (Miikkulainen et al. *J. Appl. Phys.* 2013, 113, 021301). The effect of ALD reaction temperature on the surface reaction chemistry and selectivity of ALD $Al_2O_3$ on the $CeO_2$ can be studied by performing ALD at two reaction temperatures (e.g., 100° C. and 200° C., which are the common temperature window for ALD oxides).

The specific surface oxygen storage capacitance and thermal stability of n-cycle ALD $Al_2O_3/CeO_2$ can further be analyzed. Temperature-programmed-reduction by $H_2$ and CO can probe surface oxygen species (Yao et al. *J. Catal.* 1984, 86, 254-265; Fu et al. *Science* 2003, 301, 935-938). The effects of temperature, duration, and atmosphere on the atomic-level structure of samples can be analyzed by in situ TEM with heating. n-cycle ALD $Al_2O_3/CeO_2$ can be studied as supports for metal catalysts (e.g., Pt) in CO oxidation (Vayssilov et al. *Nat. Mater.* 2011, 10, 310-315). The results can show the effect of microstructure and surface chemistry of n-cycle ALD $Al_2O_3/CeO_2$ on its specific surface oxygen storage capacitance, thermal stability, and property as a support for metal catalysts (Zhou et al. *J. Catal.* 2005, 229, 206-212).

Figure 11:
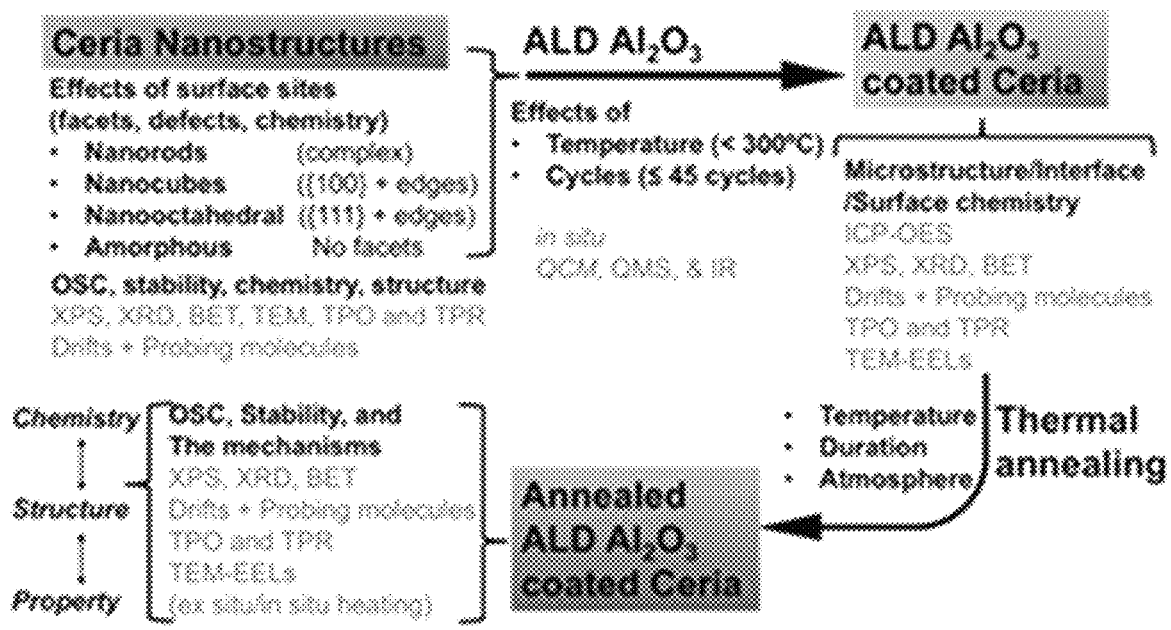
FIG. 11 is a schematic outline for studying ALD $Al_2O_3$ on $CeO_2$ nanostructures (TPO: temperature programmed oxidation; Drifts: Diffuse reflectance infrared Fourier transform spectroscopy; QCM: Quartz crystal microbalance; QMS: Quadrupole mass spectrometry; BET: surface area analyzer).

ALD $TiO_2$ or ALD $ZrO_2$ may further improve the specific surface oxygen storage capacitance and thermal stability of $CeO_2$ nanorods. ALD $TiO_2$ or $ZrO_2$ can also selectively decorate surface sites of $CeO_2$ because MLx of $TiO_2$ and $ZrO_2$ are weaker Lewis acids than trimethyl aluminum (TMA), therefore should have a better selectivity in terms of surface reactions. $TiO_2$ and $ZrO_2$ are two widely used dopants to improve specific surface oxygen storage capacitance and thermal stability of $CeO_2$ nanoparticles in three-way catalysts. The methods described above (and outlined in FIG. 11) can also be used to study specific surface oxygen storage capacitance and thermal stability of ALD ($TiO_2$ or $ZrO_2$)/$CeO_2$ nanorods.

The fundamental mechanisms, including selective surface chemistry and mechanisms for improved thermal stability and specific surface oxygen storage capacitance, can be useful in designing thermally stable $CeO_2$ nanomaterials with high specific surface oxygen storage capacitance and also can provide a general chemical strategy to improve thermal stability of many other nanomaterials of well-defined facets, such as $Cu_2O$ nanocrystals. These results can be used to engineer nanomaterials of well-defined facets at the atomic level, and can enable their applications in high temperature environments. These thermally stable nanomaterials of well-defined facets can offer catalysts with improved activity and potentially better selectivity for chemical conversions in many challenging energy applications.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A composite material comprising:
   a first metal oxide particle having a thermal stability and a specific reversible oxygen storage capacity, wherein the first metal oxide particle comprises a first metal oxide comprising a transition metal oxide; and
   a second metal oxide disposed on the first metal oxide particle;
   wherein the first metal oxide particle comprises a rod shaped particle having an average length of from 1 nanometer (nm) to 1 millimeter and an average diameter of from 1 nm to 1000 nm;
   wherein the second metal oxide is present in an amount of 5 wt. % or less based on the amount of the first metal oxide in the composite material;
   wherein the composite material has a thermal stability and a specific reversible oxygen storage capacity; and
   wherein the thermal stability of the composite material is greater than the thermal stability of the first metal oxide particle.

2. The composite material of claim 1, wherein the transition metal oxide comprises a transition metal selected from the group consisting of Ce, Mo, Fe, Ti, W, V, and combinations thereof.

3. The composite material of claim 1, wherein the transition metal oxide comprises $CeO_2$, $MoO_3$, $Fe_2O_3$, $TiO_2$, $WO_3$, $V_2O_5$, or a combination thereof.

4. The composite material of claim 1, wherein the first metal oxide particle comprises $CeO_2$.

5. The composite material of claim 4, wherein the second metal oxide comprises a metal selected from the group consisting of Al, Ti, Zr, Hf, Nb, and combinations thereof.

6. The composite material of claim 4, wherein the second metal oxide comprises $Al_2O_3$, $TiO_2$, $ZrO_2$, $HfO_2$, $Nb_2O_5$, or a combination thereof.

7. The composite material of claim 4, wherein the first metal oxide particle comprises $CeO_2$ and the second metal oxide comprises $Al_2O_3$.

8. The composite material of claim 4, wherein the second metal oxide is disposed on the first metal oxide particle as a plurality of particles comprising the second metal oxide.

9. The composite material of claim 8, wherein the plurality of particles comprising the second metal oxide have an average particle size of 5 nm or less.

10. The composite material of claim 4, wherein the composite material has a shape that remains substantially unchanged after heating the composite material at a temperature of 300° C. or more for an amount of time of 5 hours or more.

11. The composite material of claim 4, the composite material has a specific reversible oxygen storage capacity and the specific reversible oxygen storage capacity of the composite material decreases by 50% or less after heating the composite material at a temperature of 300° C. or more for an amount of time of 5 hours or more.

12. The composite material of claim 4, wherein the composite material has specific reversible oxygen storage capacity and the specific reversible oxygen storage capacity of the composite material after heating the composite material at a temperature of 300° C. or more for an amount of time of 5 hour or more is greater than the specific reversible oxygen storage capacity of the first metal oxide particle after heating the first metal oxide particle at the same temperature for the same amount of time.

13. A method of making the composite material of claim 4, the method comprising depositing the second metal oxide on the first metal oxide particle.

14. The method of claim 13, wherein the second metal oxide is disposed on the first metal oxide particle by atomic layer deposition.

* * * * *